United States Patent
Key et al.

(10) Patent No.: US 11,706,238 B2
(45) Date of Patent: Jul. 18, 2023

(54) SYSTEMS AND METHODS FOR ATTACK SIMULATION ON A PRODUCTION NETWORK

(71) Applicant: Google LLC, Mountain View, CA (US)

(72) Inventors: Christopher B. Key, McLean, VA (US); Paul E. Holzberger, Jr., Mount Crawford, VA (US)

(73) Assignee: Google LLC, Mountain View, CA (US)

(*) Notice: Subject to any disclaimer, the term of this patent is extended or adjusted under 35 U.S.C. 154(b) by 387 days.

(21) Appl. No.: 17/000,922

(22) Filed: Aug. 24, 2020

(65) Prior Publication Data
US 2020/0389484 A1 Dec. 10, 2020

Related U.S. Application Data

(63) Continuation of application No. 16/298,156, filed on Mar. 11, 2019, now Pat. No. 10,757,131, which is a
(Continued)

(51) Int. Cl.
*H04L 29/06* (2006.01)
*H04L 9/40* (2022.01)

(52) U.S. Cl.
CPC .......... *H04L 63/1433* (2013.01); *H04L 63/02* (2013.01); *H04L 63/1425* (2013.01); *H04L 63/1441* (2013.01); *H04L 63/20* (2013.01)

(58) Field of Classification Search
CPC . H04L 63/1433; H04L 63/02; H04L 63/1425; H04L 63/1441; H04L 63/20;
(Continued)

(56) References Cited

U.S. PATENT DOCUMENTS 7,954,161 B1  5/2011  Guruswamy et al.
8,402,528 B1  3/2013  McCorkendale et al.
(Continued)

FOREIGN PATENT DOCUMENTS

WO  WO-2004/031953 A1  4/2004
WO  WO-2014/066500 A1  5/2014

OTHER PUBLICATIONS

Kong et al., "Random flow network modeling and simulations for DDoS attack mitigation," IEEE International Conference on Communications, 2003. ICC '03. Year: 2003 | vol. 1 | Conference Paper | Publisher: IEEE.*
(Continued)

*Primary Examiner* — Roderick Tolentino
(74) *Attorney, Agent, or Firm* — Dority & Manning, P.A.

(57) ABSTRACT

The disclosure is directed towards systems and methods for improving security in a computer network. The system can include a planner and a plurality of controllers. The controllers can be deployed within each zone of the production network. Each controller can be configured to assume the role of an attacker or a target for malicious network traffic. Simulations of malicious behavior can be performed by the controllers within the production network, and can therefore account for the complexities of the production network, such as stateful connections through switches, routers, and other intermediary devices. In some implementations, the planner can analyze data received from the controllers to provide a holistic analysis of the overall security posture of the production network.

40 Claims, 17 Drawing Sheets

Related U.S. Application Data continuation of application No. 15/442,210, filed on Feb. 24, 2017, now Pat. No. 10,230,752.

(60) Provisional application No. 62/299,097, filed on Feb. 24, 2016.

(58) Field of Classification Search
CPC . H04L 63/1416; H04L 63/145; H04L 41/145; H04L 43/20
See application file for complete search history.

(56) References Cited

U.S. PATENT DOCUMENTS

| | | | | |
|---|---|---|---|---|
| 8,407,798 | B1* | 3/2013 | Lotem | G06F 21/55 726/18 |
| 9,208,323 | B1* | 12/2015 | Karta | G06F 21/577 |
| 10,044,746 | B2 | 8/2018 | Vallone et al. | |
| 2005/0193430 | A1* | 9/2005 | Cohen | G06F 21/577 726/25 |
| 2006/0031439 | A1 | 2/2006 | Saffre | |
| 2007/0142030 | A1 | 6/2007 | Sinha et al. | |
| 2008/0084294 | A1* | 4/2008 | Zhiying | G08B 21/12 340/539.22 |
| 2009/0007270 | A1* | 1/2009 | Futoransky | H04L 63/1433 726/25 |
| 2010/0058456 | A1 | 3/2010 | Jajodia et al. | |
| 2011/0185432 | A1 | 7/2011 | Sandoval et al. | |
| 2013/0097706 | A1 | 4/2013 | Titonis et al. | |
| 2014/0066500 | A1 | 3/2014 | Bhat et al. | |
| 2016/0029221 | A1* | 1/2016 | Suarez Garcia | G06F 21/561 455/410 |
| 2016/0072730 | A1* | 3/2016 | Ju | H04L 43/50 709/224 |
| 2016/0191476 | A1* | 6/2016 | Schutz | H04L 63/06 713/165 |
| 2016/0277435 | A1 | 9/2016 | Salajegheh et al. | |
| 2016/0285897 | A1 | 9/2016 | Gantman et al. | |
| 2016/0299221 | A1 | 10/2016 | Bushnell et al. | |
| 2016/0352561 | A1 | 12/2016 | Borgert | |
| 2017/0048266 | A1* | 2/2017 | Hovor | H04L 63/1433 |
| 2017/0126727 | A1 | 5/2017 | Beam et al. | |
| 2017/0126740 | A1 | 5/2017 | Bejarano Ardila et al. | |
| 2017/0195357 | A1* | 7/2017 | Sundhar | H04L 63/1433 |
| 2017/0302683 | A1* | 10/2017 | Kawauchi | G06F 21/53 |

OTHER PUBLICATIONS

Qwasmi et al., "Simulation of DDOS Attacks on P2P Networks," 2011 IEEE International Conference on High Performance Computing and Communications Year: 2011 | Conference Paper | Publisher: IEEE.*
Final Office Action on U.S. Appl. No. 15/442,205 dated Dec. 6, 2019.
Final Office Action on U.S. Appl. No. 16/298,156 dated Dec. 31, 2019.
International Search Report and Written Opinion for International Application No. PCT/US2017/019427, dated Jun. 7, 2017 (13 pages).
Non-Final Office Action on U.S. Appl. No. 15/442,205 dated Feb. 11, 2019.
Non-Final Office Action on U.S. Appl. No. 15/442,205 dated Apr. 23, 2020.
Non-Final Office Action on U.S. Appl. No. 16/276,997 dated Jun. 25, 2020.
Non-Final Office Action on U.S. Appl. No. 16/298,156 dated Jul. 10, 2019.
Notice of Allowance on U.S. Appl. No. 15/442,210 dated Feb. 6, 2019.
Notice of Allowance on U.S. Appl. No. 15/442,210 dated Dec. 11, 2018.
Notice of Allowance on U.S. Appl. No. 15/442,212 dated Oct. 9, 2018.
Notice of Allowance on U.S. Appl. No. 16/276,997 dated Nov. 4, 2020.
Notice of Allowance on U.S. Appl. No. 16/298,156 dated Apr. 14, 2020.
Notification Concerning Transmittal of International Preliminary Report on Patentability re PCT/US2017/019427 dated Sep. 7, 2018.

* cited by examiner

SYSTEMS AND METHODS FOR ATTACK SIMULATION ON A PRODUCTION NETWORK

CROSS-REFERENCE TO RELATED APPLICATIONS

This patent application is a continuation of, and claims priority to and the benefit of U.S. patent application Ser. No. 16/298,156, titled "SYSTEMS AND METHODS FOR ATTACK SIMULATION ON A PRODUCTION NETWORK," and filed Mar. 11, 2019, which is a continuation of, and claims priority to and the benefit of U.S. patent application Ser. No. 15/442,210, titled "SYSTEMS AND METHODS FOR ATTACK SIMULATION ON A PRODUCTION NETWORK," and filed Feb. 24, 2017, which claims priority to U.S. Provisional Patent Application No. 62/299,097, titled "SYSTEMS AND METHODS FOR ATTACK SIMULATION ON A PRODUCTION NETWORK," and filed on Feb. 24, 2016, the contents all of which are incorporated herein by reference in its entirety.

FIELD OF DISCLOSURE

The present disclosure is generally directed to various systems and methods for configuring, executing and managing attack simulations in a production network environment.

BACKGROUND

Computer network security infrastructures can be complex. Typically, they include many different components that each play a role in preventing, detecting, or responding to attacks and malicious behaviors. The security posture of an organization is the result of how the organization's people, processes, and technology all respond to a specific malicious behavior. Testing an organizations security posture to identify and correct security flaws can be complex and challenging.

BRIEF SUMMARY

Aspects and implementations of the present disclosure are generally directed to systems and methods for improving security in a computer network. Organizations such as businesses often maintain large computer networks for storing and accessing electronic information. A network can include many different types of computing devices, such as servers, desktop computers, laptop computers, mobile devices, switches, and routers that are connected to one another according to a network topology. In some implementations, a network topology may be selected to facilitate data transfer between devices in the network and also to secure sensitive information from being accessed by unauthorized users. For example, a network may be divided into various zones, each of which includes computing devices of a particular type. In some implementations, a group of servers may be organized into one zone of a network in which they are positioned in close physical proximity to one another and directly communicatively coupled to one another. Another network zone can include a group of client workstations that are used to request access to data stored on the servers. In general, a network may include any number of such zones.

Each zone of the network can be protected by various computer security mechanisms. For example, a device such an intrusion prevention system (IPS), an intrusion detection system (IDS), or a firewall may be positioned between communication paths connecting the various network zones to one another. In addition, a series of routing and switching devices also may be included in the network to interconnect the various network zones, and also to interconnect computing devices within each network zone. As a result, the overall network topology may be very complex.

In some implementations, the security of each computing device in a network may be tested individually. For example, network packets representing malicious behavior may be directed towards one of the computing devices, and the computing device can be monitored to determine whether it responds appropriately, such as by dropping the malicious packets or generating an alarm condition to indicate that the packets may correspond to an attack. Typically, such a test may be run in a laboratory setting, to avoid compromising the computing device under test in case the computing device does not successfully prevent the attack. However, such isolated lab testing scenarios may fail to fully validate the security posture of the more complex production network, even if individual computing devices appear to respond appropriately to malicious network traffic. For example, an attacker may be able to take advantage of misconfigurations that exist in the production setup but are not present in the isolated laboratory testing scenario. Furthermore, laboratory testing typically relies on simply sending a stream of packets intended to replicate malicious behavior to a given computing device. As such, there is no way to test active stateful connections that may be necessary to route through in the production network environment. Therefore, isolated laboratory testing of computing devices cannot be used to determine how a complex network would respond to malicious packets.

Instead of performing isolated laboratory testing of individual computing devices as discussed above, security of a computer network can be improved by testing within a system that is able to evaluate the security posture of an organization's complex production network. In some implementations, such a system can be included within a production network and configured such that the security posture of the production network can be evaluated without putting the computing devices within the production network at risk. For example, the system can include a planner and a plurality of controllers. The controllers can be deployed within each zone of the production network. Each node can be configured to assume the role of an attacker or a target for malicious network traffic. Simulations of malicious behavior can be performed by the controllers within the production network, and can therefore account for the complexities of the production network, such as stateful connections through switches, routers, and other intermediary devices. Moreover, simulated malicious network traffic can be constrained to take place only between controllers configured for this purpose, so that no clients or servers of the production network are put at risk. The planner can be configured to communicate with each of the controllers to provide instructions for carrying out simulations, and to receive data from the controllers corresponding to the results of the simulations. In some implementations, the planner can analyze the data received from the controllers to provide a more complete analysis of the overall security posture of the production network. The details of various embodiments of the present solution are set forth in the accompanying drawings and the description below.

Throughout this disclosure, the term "simulated attack" and "simulation" are used to indicate an attack that takes place between controllers in a production network, but which does not impact the functionality of the production equipment itself. However, it should be noted that in at least some implementations, a simulated attack between controllers can include actual network traffic that is considered malicious. For example, in a simulated attack, the controllers may exchange actual malware files or commands requesting the performance of actual malicious activity. Thus, it should be understood that the term "simulated attack" as used in this disclosure is intended to encompass behavior that is virtually indistinguishable from an authentic attack, and may in some instances be referred to as the controlled execution of an attack within a production network.

One inventive aspect of the subject matter of this disclosure can be implemented in a method for controlling execution of malicious behavior in a production network to test a security system of the production network. The method can include receiving, by a first controller on a first node in a production network with a security system, instructions to operate as an attacker and data for executing a predetermined malicious behavior on the production network. The method can include receiving, by a second controller on a second node in the production network from the planner, instructions to operate as a target of the predetermined malicious behavior by the attacker. The method can include establishing a connection between the first controller and the second controller. The method can include transmitting, responsive to the instructions by the first controller via the connection to the second controller via at least a portion of the security system of the production network, network traffic comprising the predetermined malicious behavior and generated using the data. The method can include receiving, by the first controller via the connection from the second controller, one or more responses to the network traffic. The method can include determining, by the first controller, whether the one or more responses from the second controller are as expected.

In some implementations, the method can include receiving, by the first controller, the instructions and data from a planner executing on at least one node in the production network. In some implementations, the method can include receiving, by the first controller, a plurality of requests for executing the predetermined malicious behavior via the network traffic. In some implementations, the method can include receiving, by the first controller, a plurality of responses to expect from the second controller.

In some implementations, the method can include receiving, by the second controller, a plurality of responses to transmit responsive to a corresponding request from the first controller. In some implementations, the method can include establishing the connection as at least one of a stateful connection or a secure connection. In some implementations, the method can include transmitting, by the first controller, network traffic comprises one or more requests to execute the malicious behavior.

In some implementations, the method can include generating, by the second controller, the one or more responses based at least on one of instructions or data received from a planner. In some implementations, the method can include comparing, by the first controller, the one or more responses to expected response data received from a planner. In some implementations, the method can include generating metadata about mismatches between the one or more responses and expected responses and communicating the metadata to a planner. In some implementations, the first controller and the second controller can maintain the network traffic comprising the predetermined malicious behavior contained between the first controller and the second controller via the connection.

Another inventive aspect of the subject matter of this disclosure can be implemented in a system for controlling execution of malicious behavior in a production network to test a security system of the production network. The system can include a first controller on a first node in a production network with a security system, configured to receive instructions to operate as an attacker and data for executing a predetermined malicious behavior on the production network. The system can include a second controller on a second node in the production network, configured to receive instructions to operate as a target of the predetermined malicious behavior by the attacker. The first controller and the second controller can establish a connection. Responsive to the instructions, the first controller can be configured to transmit, via the connection to the second controller via at least portions of a security system of the production network, network traffic comprising the predetermined malicious behavior and generated using the data. The first controller can be configured to receive via the connection from the second controller, one or more responses to the network traffic, and to determine whether the one or more responses from the second controller are as expected.

In some implementations, the first controller is further configured to receive the instructions and data from a planner executing on at least one node in the production network. In some implementations, the first controller is further configured to receive a plurality of requests for executing the predetermined malicious behavior via the network traffic. In some implementations, the first controller is further configured to receive a plurality of responses to expect from the second controller.

In some implementations, the second controller is further configured to receive a plurality of responses to transmit responsive to a corresponding request from the first controller. In some implementations, the first controller and the second control are further configured to establish the connection as at least one of a stateful connection or a secure connection. In some implementations, the first controller is further configured to transmit the network traffic comprising one or more requests to execute the malicious behavior.

In some implementations, the second controller is further configured to transmit the one or more responses based at least on one of instructions or data received from a planner. In some implementations, the first controller is further configured to compare the one or more responses to expected response data received from a planner. In some implementations, the first controller is further configured to generate metadata about mismatches between the one or more responses and expected responses and communicate the metadata to a planner. In some implementations, the first controller and the second controller maintain the network traffic comprising the predetermined malicious behavior contained between the first controller and the second controller via the connection.

Another inventive aspect of the subject matter of this disclosure can be implemented in a method for configuring a controlled execution of a sequence of attacks in a production network to test a security system. The method may include receiving, via a planner, a first specification of a first attack of a plurality of attacks in an attack sequence. The first specification may identify a first attack node and a first target node in a production network, a first network path selected between the first attack node and the first target node, and a first predetermined malicious behavior. A second specification of a second attack of the plurality of attack in the attack sequence may be received via the planner. The second specification may identify a second attack node and a second target node in the production network, a second network path selected between the second attack node and the second target node, and a second predetermined malicious behavior. Identification of one or more conditions upon which to execute the second attack subsequent to execution of the first attack in the attack sequence may be received via the planner. The planner may store the attack sequence including the first specification of the first attack and the second specification of the second attack. The planner may identify the stored attack sequence for controlled execution within the production network to test at least a portion of a security system. In receiving the first specification, a selection of a pairing of the first attack node and the second attack node may be received via interaction with a graphical representation of a topology of the production network. In receiving the first specification, a selection of the first network path may be received via interaction with a graphical representation of links between nodes in the production network. The received second specification may identify the second predetermined malicious behavior different than the first predetermined malicious behavior. The received second specification may identify the second attack node and the second target node including types of operating systems different than at least one of the first attack node or the first target node. The one or more conditions as a time duration between the first attack and the second attack may be identified. The one or more conditions as detection of one of failure of or success of the first attack may be identified.

Another inventive aspect of the subject matter of this disclosure can be implemented in a system for configuring a controlled execution of a sequence of attacks in a production network to test a security system. The system may include a planner executable on a processor coupled to memory. The planner may be configured to receive a first specification of a first attack of a plurality of attacks in an attack sequence, the first specification identifying a first attack node and a first target node in a production network, a first network path selected between the first attack node and the first target node, and a first predetermined malicious behavior, and receive a second specification of a second attack of the plurality of attack in the attack sequence, the second specification identifying a second attack node and a second target node in the production network, a second network path selected between the second attack node and the second target node, and a second predetermined malicious behavior. The planner may also be configured to receive identification of one or more conditions upon which to execute the second attack subsequent to execution of the first attack in the attack sequence, store the attack sequence including the first specification of the first attack and the second specification of the second attack, and identify the stored attack sequence for controlled execution within the production network to test at least a portion of a security system. The planner may be further configured to receive a selection of a pairing of the first attack node and the second attack node via interaction with a graphical representation of a topology of the production network. The planner may be further configured to receive a selection of the first network path via interaction with a graphical representation of links between nodes in the production network. The planner may be further configured to receive the second specification identifying the second predetermined malicious behavior different than the first predetermined malicious behavior. The planner may be further configured to receive the second specification identifying the second attack node and the second target node including types of operating systems different than at least one of the first attack node or the first target node. The planner may be further configured to receive identification of the one or more conditions as a time duration between the first attack and the second attack. The planner may be further configured to receive identification of the one or more conditions as detection of one of failure of or success of the first attack.

Another inventive aspect of the subject matter of this disclosure can be implemented in a method for controlled execution of a sequence of attacks in a production network to test at least a portion of a security system of the production network. The method may include identifying, by a simulation data manager, an attack sequence including a first attack and a second attack and one or more conditions upon which to execute the second attack subsequent to the first attack. The first attack may specify a first attack node and a first target node in a production network, a first network path selected between the first attack node and the first target node, and a first predetermined malicious behavior. The second attack may specify a second attack node and a second target node in the production network, a second network path selected between the second attack node and the second target node, and a second predetermined malicious behavior. The simulation data manager may communicate instructions to the first attack node and the first target node in the production network to initiate the first predetermined malicious behavior via the first path selected between the first attack node and the first target node. A result data analyzer may monitor execution of the first attack between the first attack node and the first target node for the one or more conditions. The simulation data manager may determine, responsive to detecting the one or more conditions via monitoring, to execute the second attack of the attack sequence. The simulation data manager may communicate instructions to the second attack node and the second target node in the production network to initiate the second predetermined malicious behavior via the second path selected between the second attack node and the second target node. The simulation data manager may identify the attack sequence including the first attack node and the first target node on nodes with a type of operating system different than at least one of the second attack node and second target node. The simulation data manager may identify the attack sequence including the first predetermined malicious behavior different than the second predetermined malicious behavior. The simulation data manager may identify the attack sequence including the first selected network path different than the second selected network path. Responsive to instructions from the planner via a connection to the first target node and via at least a portion of the security system of the production network, the first attack node may transmit network traffic including the first predetermined malicious behavior. The one or more conditions including a time duration may be detected via monitoring. The one or more conditions including at least one of failure or success of the first predetermined malicious attack may be detected via monitoring.

Another inventive aspect of the subject matter of this disclosure can be implemented in a system for controlled execution of a sequence of attacks in a production network to test at least a portion of a security system of the production network. The system may include a simulation data manager executable on a processor coupled to memory, and a result data analyzer. The simulation data manager may be configured to identify an attack sequence including a first attack and a second attack and one or more conditions upon which to execute the second attack subsequent to the first attack. The first attack may specify a first attack node and a first target node in a production network, a first network path selected between the first attack node and the first target node, and a first predetermined malicious behavior. The second attack may specify a second attack node and a second target node in the production network, a second network path selected between the second attack node and the second target node, and a second predetermined malicious behavior. The simulation data manager may be configured to communicate instructions to the first attack node and the first target node in the production network to initiate the first predetermined malicious behavior via the first path selected between the first attack node and the first target node. The result data analyzer may be configured to monitor execution of the first attack between the first attack node and the first target node for the one or more conditions. The simulation data manager, responsive to the result data analyzer detecting the one or more conditions, may be configured to determine to execute the second attack of the attack sequence. The simulation data manager may be further configured to communicate instructions to the second attack node and the second target node in the production network to initiate the second predetermined malicious behavior via the second path selected between the second attack node and the first second node. The simulation data manager may be further configured to identify the attack sequence including the first attack node and the first target node on nodes with a type of operating system different than at least one of the second attack node and second target node. The simulation data manager may be further configured to identify the attack sequence including the first predetermined malicious behavior different than the second predetermined malicious behavior. The simulation data manager may be further configured to identify the attack sequence including the first selected network path different than the second selected network path. The first attack node may be configured to, responsive to instructions from a planner, transmit via a connection to the first target node and via at least a portion of the security system of the production network, network traffic including the first predetermined malicious behavior. The result data analyzer may be further configured to detect the one or conditions including a time duration. The result data analyzer may be further configured to detect the one or conditions including at least one of failure or success of the first predetermined malicious attack.

Another inventive aspect of the subject matter of this disclosure can be implemented in a method for controlled execution of a malicious behavior between multiple different components in a production network to test at least a portion of a security system of the production network. The method can include identifying, by a server, a packet capture (PCAP) file to use for providing instructions for controlled execution of malicious behavior on a plurality of different components of a production network. The method can include identifying, by the server, a first attack to execute against a first device of a plurality of different components, a second attack to execute against a second device of the plurality of different components, and a third attack to execute against a network component of the plurality of different components intermediary to the first end point device and the second device. The method can include communicating, by the server based on at least the PCAP file, a first set of instructions to a first pair of attack and target nodes in the production network to initiate the malicious behavior of the PCAP file against the first device, a second set of instructions to a second pair of attack and target nodes in the production network to initiate the malicious behavior of the PCAP file against the second device, and a third set of instructions to a third pair of attack and target nodes in the production network to initiate the malicious behavior of the PCAP file against the network component intermediary to the first device and the second device. The method can include aggregating, by the server, results of each of the first attack, the second attack, and the third attack to provide an aggregated view of the malicious behavior between the first device and the second device via the network component.

In some implementations, one of the first device or the second device is an end point device. In some implementations, the method can include determining, by the server, from processing of the PCAP file one of a type of application traffic or communication protocol represented by the PCAP file. In some implementations, the method can include extracting, by the server, from the PCAP file an application layer record of requests and responses exchanged between an attacker and a target captured in the PCAP file. In some implementations, the method can include identifying, by the server, the malicious behavior from the PCAP file. In some implementations, the method can include extracting, by the server, from the PCAP file content of a malware file for communicating the malicious behavior.

In some implementations, the method can include identifying, by the server, a first network path selected for the first attack, a second network path selected for the second attack and a third network path selected for the third attack. In some implementations, the method can include communicating, by the server, to each of the first pair of attack and target nodes, second pair of attack and target nodes and third part of attack and target nodes instructions comprising metadata determined from the PCAP file. In some implementations, the method can include receiving, by the server, results of controlled execution of each of the first attack between the first attack node and first target node of the first attack-target node pair, the second attack between the second attack node and second target node of the second attack-target node pair, and the third attack between the third attack node and third target node of the third attack-target node pair. In some implementations, the method can include communicating, by the server, the aggregated results to an event management device to determine security events that occurred during the controlled execution of at least one of the first attack, the second attack, or the third attack.

Another inventive aspect of the subject matter of this disclosure can be implemented in a system for controlled execution of a malicious behavior between multiple different components in a production network to test at least a portion of a security system of the production network. The system can include a server. The server can be configured to identify a packet capture (PCAP) file to use for providing instructions for controlled execution of malicious behavior on a plurality of different components of a production network. The server also can be configured to identify a first attack to execute against a first device of a plurality of different components, a second attack to execute against a second device of the plurality of different components, and a third attack to execute against a network component of the plurality of different components intermediary to the first end point device and the second device. The server can be configured, based on at least the PCAP file, to communicate a first set of instructions to a first pair of attack and target nodes in the production network to initiate the malicious behavior of the PCAP file against the first device, a second set of instructions to a second pair of attack and target nodes in the production network to initiate the malicious behavior of the PCAP file against the second device, and a third set of instructions to a third pair of attack and target nodes in the production network to initiate the malicious behavior of the PCAP file against the network component intermediary to the first device and the second device. The server also can be configured to aggregate results of each of the first attack, the second attack, and the third attack to provide an aggregated view of the malicious behavior between the first device and the second device via the network component.

In some implementations, one of the first device or the second device is an end point device. In some implementations, the server is further configured to determine from processing of the PCAP file one of a type of application traffic or communication protocol represented by the PCAP file. In some implementations, the server is further configured to extract from the PCAP file an application layer record of requests and responses exchanged between an attacker and a target captured in the PCAP file. n some implementations, the server is further configured to identify the malicious behavior from the PCAP file.

In some implementations, the server is further configured to extract from the PCAP file content of a malware file for communicating the malicious behavior. In some implementations, the server is further configured to identify a first network path selected for the first attack, a second network path selected for the second attack and a third network path for the third attack.

In some implementations, the server is further configured to communicate each of the first pair of attack and target nodes, second pair of attack and target nodes and third part of attack and target nodes instructions comprising metadata determined from the PCAP file.

In some implementations, the server is further configured to receive results of controlled execution of each of the first attack between the first attack node and first target node of the first attack-target node pair, the second attack between the second attack node and second target node of the second attack-target node pair, and the third attack between the third attack node and third target node of the third attack-target node pair. In some implementations, the server is further configured to communicate the aggregated results to an event management device to determine security events that occurred during the controlled execution of at least one of the first attack, the second attack or the third attack.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
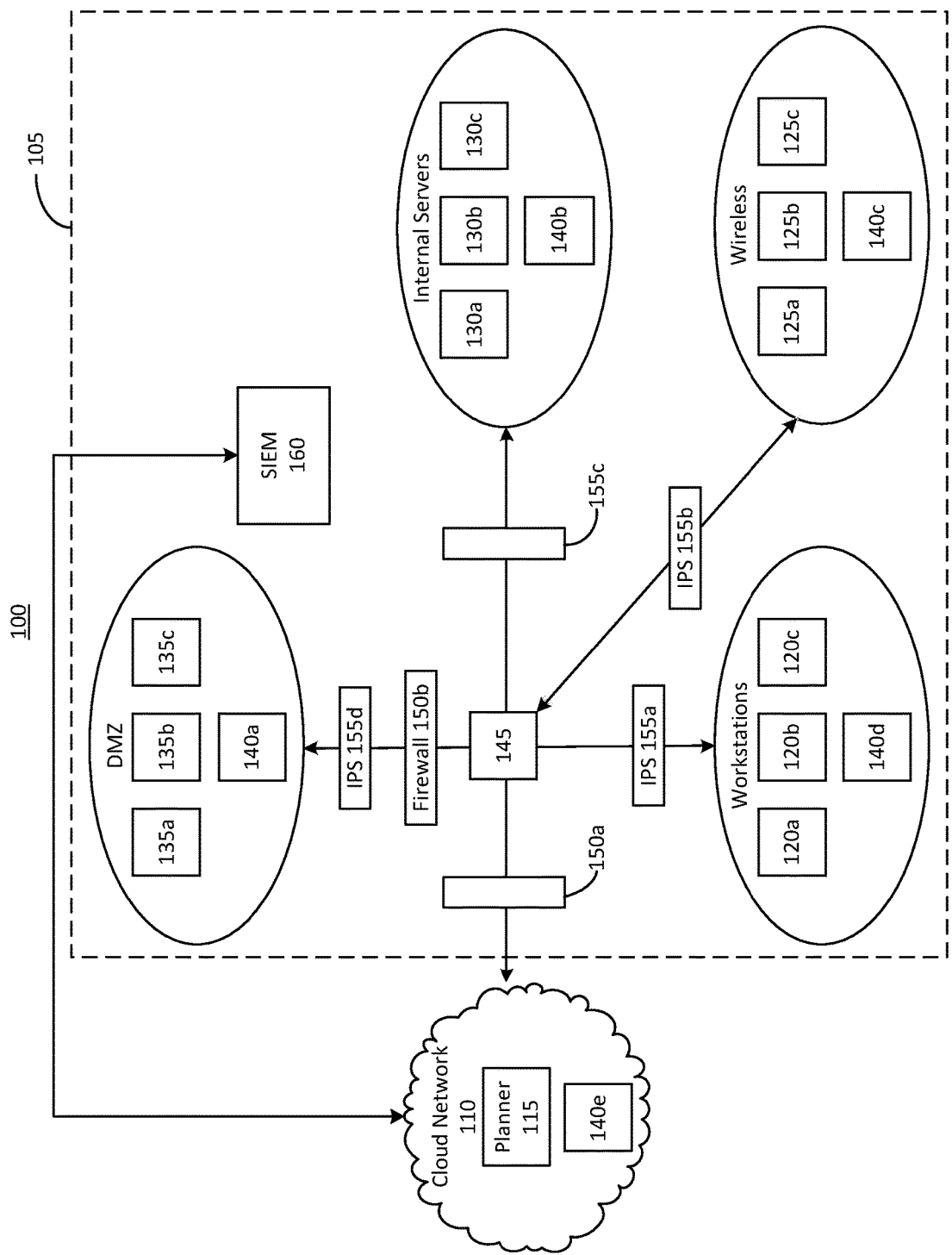
FIG. 1A shows a block diagram of an example system for improving network security.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes graphical user interfaces (GUIs) which may be useful for practicing embodiments described herein;

Section C describes techniques for controller-to-controller communication which may be useful for testing security of a production network;

Section D describes attack simulation sequences which may be useful for testing security of a production network;

Section E describes packet capture (PCAP) traffic recording techniques which may be useful for testing security of a production network; and Section F describes architectures for computing devices which may be useful for implementing the network environment and computing environment described in Section A.

A. Network and Computing Environment

Aspects and implementations of the present disclosure are directed to systems and methods for improving security in a computer network. Organizations such as businesses often maintain large computer networks for storing and accessing electronic information. A network can include many different types of computing devices, such as servers, desktop computers, laptop computers, mobile devices, switches, and routers that are connected to one another according to a network topology. In some implementations, a network topology may be selected to facilitate data transfer between devices in the network and also to secure sensitive information from being accessed by unauthorized users. For example, a network may be divided into various zones, each of which includes computing devices of a particular type. In some implementations, a group of servers may be organized into one zone of a network in which they are positioned in close physical proximity to one another and directly communicatively coupled to one another. Another network zone can include a group of client workstations that are used to request access to data stored on the servers. In general, a network may include any number of such zones.

Each zone of the network can be protected by various computer security mechanisms. For example, a device such an intrusion prevention system (IPS), an intrusion detection system (IDS), or a firewall may be positioned between communication paths connecting the various network zones to one another. In addition, a series of routing and switching devices also may be included in the network to interconnect the various network zones, and also to interconnect computing devices within each network zone. As a result, the overall network topology may be very complex.

In some implementations, the security of each computing device in a network may be tested individually. For example, network packets representing malicious behavior may be directed towards one of the computing devices, and the computing device can be monitored to determine whether it responds appropriately, such as by dropping the malicious packets or generating an alarm condition to indicate that the packets may correspond to an attack. Typically, such a test may be run in a laboratory setting, to avoid compromising the computing device under test in case the computing device does not successfully prevent the attack. However, such isolated lab testing scenarios may fail to fully validate the security posture of the more complex production network, even if individual computing devices appear to respond appropriately to malicious network traffic. For example, an attacker may be able to take advantage of misconfigurations that exist in the production setup but are not present in the isolated laboratory testing scenario. Furthermore, laboratory testing typically relies on simply sending a stream of packets intended to replicate malicious behavior to a given computing device. As such, there is no way to test active stateful connections that may be necessary to route through in the production network environment. Therefore, isolated laboratory testing of computing devices cannot be used to determine how a complex network would respond to malicious packets.

Instead of performing isolated laboratory testing of individual computing devices as discussed above, security of a computer network can be improved by testing within a system that is able to evaluate the security posture of an organization's complex production network. In some implementations, such a system can be included within a production network and configured such that the security posture of the production network can be evaluated without putting the computing devices within the production network at risk. For example, the system can include a planner and a plurality of controllers. The controllers can be deployed within each zone of the production network. Each node can be configured to assume the role of an attacker or a target for malicious network traffic. Simulations of malicious behavior can be performed by the controllers within the production network, and can therefore account for the complexities of the production network, such as stateful connections through switches, routers, and other intermediary devices. Moreover, simulated malicious network traffic can be constrained to take place only between controllers configured for this purpose, so that no clients or servers of the production network are put at risk. The planner can be configured to communicate with each of the controllers to provide instructions for carrying out simulations, and to receive data from the controllers corresponding to the results of the simulations. In some implementations, the planner can analyze the data received from the controllers to provide a more complete analysis of the overall security posture of the production network.

Throughout this disclosure, the terms "simulated attack" and "simulation" are used to indicate an attack that takes place between controllers in a production network, but which does not impact the functionality of the production equipment itself. However, it should be noted that in at least some implementations, a simulated attack between controllers can include actual network traffic that is considered malicious. For example, in a simulated attack, the controllers may exchange actual malware files or commands requesting the performance of actual malicious activity. Thus, it should be understood that the term "simulated attack" as used in this disclosure is intended to encompass behavior that is virtually indistinguishable from an authentic attack, and may in some instances be referred to as the controlled execution of an attack within a production network.

FIG. 1A shows a block diagram of an example system 100 for improving network security. The system 100 includes an internal enterprise network 105, shown within broken lines, as well as an external cloud network 110. In some implementations, the enterprise network 105 can be a network maintained by an organization, such as a business or government entity, for storing and accessing electronic information and for facilitating electronic communication among members of the organization. The cloud network includes a planner 115 and a controller 140e. The enterprise network 105 includes several computing devices grouped into several different zones. For example, a "workstations" zone includes several workstations 120a-120c, a "wireless" zone includes several wireless devices 125a-125c, an "internal servers" zone includes several servers 130a-130c, and a "demilitarized zone" (also referred to as a "DMZ zone") that includes several computing devices 135-135c. Each of the network zones in the enterprise network 105 also includes a respective one of the controllers 140a-140d. The computing devices in the various zones of the enterprise network 105 are communicatively coupled to one another, and to the external cloud network 110, through a router 145. Various network security mechanisms are positioned along the communication paths between the router 145, the network zones of the enterprise network 105, and the external cloud network 110. For example, a firewall 150a is positioned between the router 145 and the cloud network 110, an intrusion protection system (IPS) 155d and a firewall 150b are positioned between the router 145 and the DMZ zone, an IPS 150c is positioned between the router 145 and the internal servers zone, an IPS 155b is positioned between the router 145 and the wireless zone, and an IPS 155a is positioned between the router 145 and the workstations zone. Finally, a security information and event management (SIEM) device 160 is included within the enterprise network 105 and communicatively coupled to the cloud network 110. The SIEM device 160 also can be communicatively coupled to each of the firewalls 150a and 150b and to each of the IPSs 115a-155d.

The system 100 can be configured to facilitate comprehensive evaluation of the security posture of the enterprise network 105. In some implementations, testing of the security posture of the enterprise network 105 can be carried out by the planner 115 and the controllers 140. Because the controllers 140 are positioned within the enterprise network 105, the tests performed by the controllers 140 can accurately reflect the complexity of the enterprise network 105 better than isolated laboratory testing of individual components taken out of the network topology. Furthermore, because tests do not rely on communications between the production computing devices in each network zone (i.e., the computing devices 135 in the DMZ zone, the servers 130 in the internal server zone, the wireless devices 125 in the wireless zone, and the workstations 120 in the workstation zone), the production computing devices are never put at risk during testing.

In some implementations, the controllers 140 serve only to test the security of the enterprise network 105. That is, the controllers 140 may not be used for typical day-to-day operations of the enterprise network 105. For example, although the controller 140d is positioned within the workstation zone alone with the workstations 120a-120d, the controller 140d itself may not serve as a workstation. Rather, the controller 140d is positioned within the workstation group for the purpose of testing how a workstation 120 would respond to malicious behavior without actually putting any of the workstations 120 at risk. Likewise, the controller 140c is positioned within the wireless group, but may not be a production wireless device like the wireless devices 125, the controller 140b may not be an internal server like the internal servers 130, and the controller 140a may not be a computing device that serves the same purpose as the computing devices 135. Instead, the controllers 140a-140d serve only to test the expected response behavior of devices in their respective zones when exposed to malicious network traffic. The controllers 140 can assume the roles of attacker and target during a simulation of malicious behavior, so that the security posture of the enterprise network 105 can be evaluated without putting the other devices in the enterprise network 105 at risk.

In some implementations, the planner 115 can manage the controllers 140 in order to facilitate the execution of simulated attacks by the controllers 140. For example, the planner 115 can send to the controllers 140 instructions regarding specific simulated malicious behaviors that the controllers 140 are to execute. The planner 115 also can receive from the controllers 140 information corresponding to the results of simulations. Generally, management data between the planner 115 and the controllers 140 can include initial registration of each of the controllers 140 with the planner 115, configuration instructions sent to the controllers 140, simulation execution instructions sent to the controllers 140, status updates, and simulation result data. Management data is discussed in greater detail below. In some implementations, the planner 115 can communicate with each of the controllers 140 via an encrypted channel. Each controller 140 can include a dedicated channel (e.g., a dedicated IP interface) to the planner 115.

In general, a simulation can include data exchanged between two controllers 140 that is intended to replicate the network traffic that would be seen in the event of an attack or other form of malicious behavior. Because there are controllers 140 positioned within each zone of the enterprise network 105, the traffic patterns (i.e., requests and responses between controllers 140) of such simulations can be identical to the traffic patterns that would be observed during an actual attack. In some implementations, the data exchanged between two controllers 140 during a simulation can emulate data that would be sent during an actual attack. In one example, the planner 115 can send instructions to two of the controllers, such as the controller 140a in the DMZ zone and the controller 140d in the workstations zone, to execute a particular simulation. The planner can instruct either of the two controllers 140a and 140d to act as the attacker, and the other to act as the target. Each controller 140a and 140d can receive from the planner 115 information corresponding to the network traffic it should send to the other controller 140a or 140d, as well as information corresponding to the responses it should expect from the other controller 140a or 140d. The two controllers 140a and 140d can then create connections between one another, which may be stateful connections through the router 145, the IPSs 155a and 155d, and the firewall 150b. Simulation data can then be transmitted between the controllers 140a and 140d according to the simulation instructions they received from the planner 115. During the simulation, each of the controllers 140a and 140d can compare the responses it receives to the responses it expects to receive. For example, in some implementations, the expected response may differ from the actual response in implementations in which the IPSs 155a and 155d or the firewall 150b drops packets after determining that the network traffic associated with the simulation may be malicious. In some implementations, the controllers 140a and 140d may then report the results of the simulation to the planner 115. In some implementations, the security mechanisms within the enterprise network 105, such as the IPSs 155a and 155d or the firewall 150b, can report information to the SIEM device 160, which in turn can report this information to the planner 115. The planner 115 can then aggregate and analyze the data it receives from the controllers 140a and 140d and the SIEM device 160 to determine whether the simulated attack was successfully prevented or detected by the IPSs 155a and 155d or the firewall 150b. Additional details relating to simulated attacks are discussed further below in connection with FIG. 2.

It should be understood that the above description presents only a single non-limiting example of a simulated attack, and many other simulations may be run in a similar manner. For example, in some implementations, any one of the controllers 140a-140e can act as a target, and any other of the controllers 140a-140e can act as the attacker for another simulation. Thus, because the system 100 includes the controller 140e that is external to the enterprise network 110, simulations can be run to emulate an attack originating from outside of the enterprise network 110, for example, by designating the controller 140e to serve as the attacker during a simulation. The path through the enterprise network (and therefore the security mechanisms in the enterprise network) that are tested can be determined based on the topology of the enterprise network 105 and the location of the attacker and target controllers 140. In some implementations, the planner 115 can store information about the topology of the enterprise network 105, including information corresponding to which controllers 140 are reachable from other controllers 140. The planner 115 can use this information to ensure that simulations are only performed between controllers that are positioned within zones that are actually reachable from one another, so that time and resources are not spent on simulating attacks that would not be possible to carry out.

It should be understood that, while the planner 115 is shown as located within the external cloud network 115, in some implementations the planner 115 can instead be located within the enterprise network 105. Furthermore, while the planner 115 and the controller 140e are shown as two separate entities within the cloud network 110, in some implementations a single computing device may be used to implement the functionality of both the planner 115 and the controller 140e. In implementations in which the planner 115 is instead located within the enterprise network 110, the functionality of the planner 115 and at least one of the controllers 140a-140d in the enterprise network may be implemented by a single computing device. For example, the planner 115 can be positioned within the DMZ zone, and the functionality of the planner 115 and the controller 140a within that zone can be implemented by a single computing device.

Figure 1B:
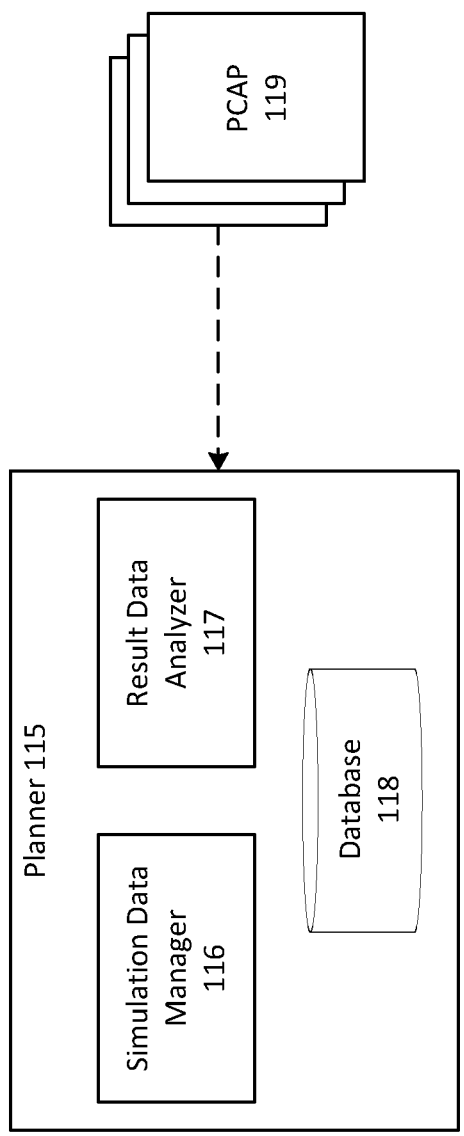
FIG. 1B shows a block diagram of an example planner included in the system network of FIG. 1A.

FIG. 1B shows a block diagram of an example planner 115 included in the example system of FIG. 1A. The planner 115 includes a simulation data manager 116, a result data manager 117, and a database 118. Also shown in FIG. 1B is a plurality of packet capture (PCAP) files 119, which can be received by the planner 115.

As discussed above, the planner 115 can serve to manage the execution of simulated attacks that take place between the controllers 140 shown in FIG. 1A. As shown in FIG. 1A, the planner 115 can be a centralized computing device that exists in an external cloud network, such as the internet. In some other implementations, the planner 115 can be deployed within the enterprise network 105 and maintained by the organization that maintains the enterprise network 105.

The simulation data manager 116 can be configured to handle the transmission and receipt of data related to attack simulations. For example, in some implementations, the simulation data manager 116 can send and receive information related to initial registration of each controller 140, configuration of each controller 140, simulation execution instructions, and simulation results. Initial registration can be any process that pairs each of the controllers 140 with the planner 115. In some implementations, a private key exchange can take place between each controller 140 and the planner 115, which can help to ensure that no other computing devices can impersonate one of the controllers 140, which could compromise the security of the enterprise network 105 in which the controllers 140 are deployed.

The simulation data manager 116 also can generate and transmit to the controllers 140 simulation execution instructions. Generally, simulation execution instructions include any information necessary for the controllers 140 to carry out a simulated attack. For example, simulation instructions can include a collection of all of the requests that each controller 140 should make during a simulation, as well as all of the responses that the each controller 140 should receive during the simulation. Simulation execution instructions can be based on an actual attack that has been carried out in the past and that could potentially pose a threat to the enterprise network 105. In some implementations, the simulation data manager 116 can generate instructions for such a simulation based on PCAP files corresponding to the actual attack. For example, the PCAP files 119 can be received by the planner 115 and stored in the database 118. The simulation data manager 116 can retrieve a PCAP file 119 from the database 118 and can process the PCAP file 119 to generate simulation instructions that will cause the controllers 140 to send network traffic to replicate the attack. In some implementations, the simulation data manager 116 can analyze the PCAP file 119 to extract the application-layer record of requests and responses exchanged between the attacker and the target. In one example, a PCAP file 119 may correspond to an attack in which an attacker receives an HTTP GET request from a target, and subsequently redirects the request to an end server which causes a piece of malware to be installed on the target device. The PCAP file 119 will typically contain low-level packet information related to data exchanged during the attack. However, the simulation data manager 116 can process the PCAP file 119 to extract the higher-level application layer record of each HTTP request and response, including the content of the actual malware file, to create a set of instructions for the controllers 140 so that the controllers 140 can accurately replicate the attack within the enterprise network 105.

In some implementations, the simulation data manager 116 can be configured to process a PCAP file by first identifying each host conversation within the PCAP file. For example, the simulation data manager 116 can make this determination based on the communication protocol exhibited in the PCAP file. The simulation data manager 116 also can determine the type of application traffic represented by the PCAP file, such as HTTP traffic that may be sent using TCP, or DNS traffic that may be sent using UDP. In some implementations, the determination of the type of application traffic represented by the PCAP file can be made based on the use of application signatures in the PCAP file.

The simulation data manager 116 can be configured to extract higher level (e.g., application level) data from each conversation present in the PCAP file. In some implementations, this extraction can be performed based on the type of application data within each conversation. The simulation data manager 116 can save the higher level data in the database 118. In some implementations, the simulation data manager 116 also can generate metadata to be included in the simulation instructions. Metadata generated by the simulation data manager 116 can be associated with the higher level data. For example, metadata can include the communication protocols in use and, in instances in which the protocol is TCP or UDP, a list of the significant ports used during the conversation. The simulation data manager 116 can then assign roles to each higher level request and response extracted from the PCAP files based on the type of application that created the original conversation represented in the PCAP file. In some implementations, the roles assigned by the simulation data manager 116 may be generic roles such as "attacker" and "target," or "client" and "server." In some other implementations, the roles assigned by the simulation data manager 116 may be more specific, such as "DNS server." Metadata provided to the controllers 140 can help the controllers 140 to determine whether the responses they receive are similar to the expected responses, so that the controllers 140 can determine whether the attack was successfully replicated or whether security mechanisms within the network 105 intervened to stop the attack. Metadata also can provide additional details on how each controller should make the requests associated with the simulation. In some implementations, the simulation data manager 116 can generate metadata including how many separate sockets or connections should be used when simulating an attack, which IP protocols and significant ports should be used, what type of application data should be used in each connection, whether the data is a valid representation of the leveraged application or protocol, and what role each controller 140 should serve in the simulation (i.e., whether each controller 140 should act as an attacker or a target).

The simulation data manager 116 can manage simulations executed by the controllers 140 in a variety of ways. In some implementations, the simulation data manager 116 can communicate directly with each of the two controllers 140 that are to be involved in a simulation (i.e., a first controller 140 that will act as an attacker, and a second controller 140 that will act as a target). In such implementations, the simulation data manager 116 can send simulation data directly to both of the first and second controllers 140. The simulation data sent to the controllers 140 can include any of the data discussed above, including information corresponding to the requests that each controller 140 should send and metadata corresponding to the responses that each controller 140 should expect to receive. In response to sending the management data, the simulation data manager 116 can receive an acknowledgement from each of the controllers 140 indicating that they have received the management data and are ready to begin executing the simulation. The simulation data manager 116 can then send additional management data to the first controller 140 (i.e., the attacker) instructing the first controller 140 to begin the simulation. In some implementations, the simulation data manager 116 can continue to send and receive information to and from the first and second controllers 140. For example, the simulation data manager 116 may send status requests to each of the first and second controllers 140 to determine whether the simulation has completed. After the simulation data manager 116 receives responses from both of the controllers 140 indicating that the simulation has completed, the simulation data manager 116 can receive information corresponding to the results of the simulation from each of the first and second controllers 140. In some implementations, the simulation data manager 116 can be configured to "pull" the result information from the first and second controllers 140 by explicitly requesting that the controllers 140 send the result information. In some other implementations, the controllers 140 can be configured to "push" their respective result data to the simulation data manager 116 of the planner 115, and the simulation data manager 116 can receive the result information from each of the controllers 140 without first requesting the result information.

In some implementations, the simulation data manager 116 may interact with only one of the controllers 140 involved in a simulation. For example, all of the data for the simulation, including the data that a second controller 140 will require in order to execute the simulation, can be sent by the simulation data manager 116 to the first controller 140. The first controller 140 can then send management data to the second controller 140, and the simulation can be executed. After the simulation is complete, the second controller 140 can send its result data directly to the first controller 140 instead of to the simulation data manager 116. The simulation data manager 116 can then receive the aggregated simulation results from both controllers 140 from the first controller 140.

The result data analyzer 117 can be configured to generate information related to the results of one or more simulations. In some implementations, the information generated by the result data analyzer 117 can be based on information received from the controller 140 and from the SIEM device 160. For example, the result data analyzer 117 can be configured to query the SIEM device 160 for information related to security events that may have occurred in the enterprise network 105 during a simulation. As discussed above, the SIEM device 160 can be configured to receive such information from the various security mechanisms in the enterprise network 105, such as the firewalls 150a and 150b, and the IPSs 155a-155d. All of the information received by the SIEM device 160 can be sent to the result data analyzer 117 of the planner 115. In some implementations, the database 118 may contain instructions to be used by the result data analyzer 117 for querying the SIEM device 160. For example, the SIEM device 160 may be a commercial product developed by a third party. The database 118 can contain application programming interfaces (APIs) associated with various third party SIEM devices 160, and the result data analyzer 117 can be configured to retrieve the appropriate API from the database 118 and use the API to send and receive information with the SIEM device 160.

In some implementations, the result data analyzer 117 also can receive information from each of the controllers 140 after a simulation has completed. For example, the result data analyzer 117 can receive metadata generated by the controllers 140 during execution of a simulation. Such metadata may include the start time and end time for the simulation, the sockets and ports used during the simulation, and an indication of whether each controller 140 received the expected responses from other controllers 140 during the simulation.

In some implementations, the result data analyzer 117 can correlate the information received from the SIEM device 160 with the information received from the controllers 140. For example, the result data analyzer 117 can determine that the metadata received from one of the controllers 140 indicates that it did not receive a response that it expected during a simulation. The result data analyzer 117 can then examine the data received from the SIEM device 160 to determine why the expected response was not received. For example, the result data analyzer 117 may determine based on the data received from the SIEM device that the expected response was not received because the packets corresponding to the expected response were blocked by one of the firewalls 150a and 150b or by one of the IPSs 155a-155d. In some implementations, the result data analyzer 117 also can be configured to produce graphical output corresponding to the result data, which may be provided to an administrator. Examples of graphical user interfaces for displaying such result data are described further below.

Figure 1C:
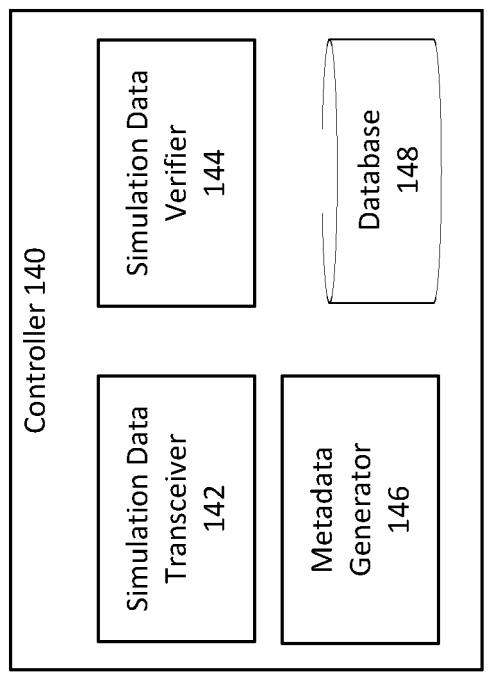
FIG. 1C shows a block diagram of an example controller included in the system network of FIG. 1A.

FIG. 1C shows a block diagram of an example controller 140 included in the system network of FIG. 1A. The controller 140 can include a simulation data transceiver 142, a simulation data verifier 144, a metadata generator 146, and a database 148. As discussed above, the controller 140 can execute simulated attacks and other malicious behaviors directly within the enterprise network 105. The enterprise network 105 may include several instances of the controller 140 (e.g., at least one instance of the controller 140 in each zone of the enterprise network 105), and all of the controllers 140 may have a structure similar to that shown in FIG. 1C.

In general, the controller 140 can be a self-contained device or software application that remains separate from the production equipment used in the enterprise network 105. This configuration can help to improve the security of the enterprise network 105, because the controllers 140, which execute simulated attacks and therefore may be associated with malicious network traffic, do not have to be relied upon to also serve as production equipment. Thus, no production equipment within the enterprise network 105 is put at risk. In some implementations, the controller 140 can be implemented as a virtual machine (VM). For example, the controller 140 can be a security hardened VM that executes on a computing device within the enterprise network 105. In other implementations, the controller 140 can be a physical computing device. Whether implemented as a VM or a physical computing device, the controller 140 can include or can execute an operating system selected to emulate a particular type of computing device for simulations. For example, the controller 140 may execute a Windows operating system, a Mac OS X operating system or any other operating system corresponding to a device that is to be emulated.

In some implementations, the operating system of the controller 140 can be independent of the type of computing device and/or attack simulation or behavior to be emulated. For example, the controller 140 may run a Linux operating system, but still may emulate a Windows computing device during a simulation by sending data packets that are formatted as if they originated from a device executing a Windows operating system. So regardless of the type of operating system being deployed or used for the VM, the controller may be designed, constructed, or implemented to simulate an attack and/or behavior of an operating system other than or different from the operating system of the VM. For example, the VM may comprise a Linux operating system, but the controller may be implemented to carry out an attack simulation for a MAC OS attack.

The controller 140 can maintain a relatively aggressive security profile. For example, in some implementations, the controller 140 can be configured to refuse connections from all other computing devices at all times except when the controller 140 is executing a simulation. In some other implementations, the controller 140 can be configured to communicate only with a limited number of other computing devices, such as the planner 115. Limiting the number of computing devices in this way can help to prevent an outside attacker from accessing the controller 140 without authorization. During the execution of a simulation, the controller 140 can be configured to communicate only with other controllers 140 within the enterprise network 105, such that the controller 140 is unable to communicate with production computing devices in the enterprise network. Such a configuration can prevent the production computing devices from accidentally receiving malicious network traffic that may be transmitted between controllers as part of a simulation.

The simulation data transceiver 142 can be configured to transmit and receive data related to the execution of simulations. For example, the simulation data transceiver 142 can receive simulation management data from the planner 115. As discussed above, simulation management data can include instructions for executing various simulations, such as information relating to the network traffic that should be transmitted by the controller 140 during a simulation, the destination to which the network traffic should be sent, and the types of responses that should be expected. In some implementations, the simulation data transceiver 142 can be configured to "pull" such management data from the planner 115, and to drop packets that are "pushed" to the simulation data transceiver 142. That is, the simulation data transceiver 142 may be configured to request such management data from the planner 115, and to refuse any data that purports to come from the planner 115 unless the data is sent in response to a request. This configuration can help to prevent attacks from devices that may attempt to attack the controller 140 by impersonating the planner 115. In some other implementations, the simulation data transceiver 142 can be configured to receive management data that is pushed from the planner 115.

The simulation data transceiver 142 also can be configured to send and receive network traffic to and from other controllers 140 in the enterprise network 105. For example, during a simulation, the simulation data transceiver 142 can connect to other controllers 140 to simulate an attack. In some implementations, the simulation data transceiver 142 can open a connection to another controller 140 via routing and switching devices such as the router 145. In some implementations, the simulation data transceiver 142 can maintain a stateful connection with such devices, in the same manner as would be done by another computing device in the same network zone. The simulation data transceiver 142 can send simulation data using any type of protocol, including TCP or other protocols that require a stateful connection. In some implementations, information corresponding to the data to be sent during a simulation can be stored in the database 148, and the simulation data transceiver 142 can retrieve that data from the database 148. The simulation data transceiver 142 also can be configured to receive network traffic from another controller 140 during a simulation. For example, the simulation data transceiver 142 can receive responses from another controller 140 after sending a request to the other controller 140.

As discussed above, simulation data can be extracted or generated based on a PCAP file representing a conversation between two host devices. In some implementations, the simulation data transceiver 142 can be configured to send simulation data to a second controller 140 based on the applications involved in the original conversation. For example, the operating system of the controller 140 can include an implementation of a TCP/IP stack, and the simulation data transceiver 142 can make use of this stack when executing a simulation whose original conversation was conducted using an application that requires TCP communication. The simulation data transceiver 142 also may have additional functionality to increase the realism of simulation data and to assist with transmitting simulation data to a second controller 140 through the complex topology of the enterprise network. For example, the simulation data transceiver 142 may support network address translation (NAT) and proxies with and without authentication, such as Basic, Radius, NTLM, and Kerberos. Thus, before a message is sent by the simulation data transceiver 142, the simulation data transceiver 142 can be configured to adjust the message as needed based on the topology of the enterprise network. For example, the simulation data transceiver 142 may add Kerberos service ticket information for proxy authentication into an HTTP packet header, if such information is required by the enterprise network.

In some implementations, the simulation data transceiver 142 can be configured to open an encrypted channel between the controller 140 and another controller 140 when running a simulated attack. An encrypted channel for attack simulations can better simulate a real attack within the enterprise network 105, because some attacks rely on using encrypted network traffic to avoid being detected or blocked by security mechanisms. Thus, by sending encrypted network traffic during an attack, the security mechanisms in the enterprise network can be more thoroughly tested. In some implementations, if the security mechanisms, such as the IPSs and firewalls, are not decrypting and inspecting encrypted network traffic, an attack may be successfully carried out in the enterprise network. For example, certain security mechanisms should act as a secure socket layer (SSL) man-in-the-middle proxy to decrypt network traffic and direct the decrypted network traffic through an IPS or IDS. By using encrypted traffic for some attack simulations, this functionality can be tested and an administrator can be notified if the encrypted attack simulation goes undetected, so that the problem can be corrected. In some implementations, the simulation data transceiver 142 also can be configured to establish a second channel between the controller 140 and the other controller 140 that is participating in a simulation. The second channel can be used to send management data, which may include commands and configuration information that is separate from the actual simulated attack data. Separating the management data from the attack data can provide a more realistic attack simulation, because the encrypted first channel is used only for attack data, as would occur during an actual attack.

The simulation data verifier 144 can be configured to determine whether the network traffic received from another controller 140 during a simulation corresponds to the expected responses. In some implementations, the database 148 can store information corresponding to the responses that are expected to be received during a simulation. The simulation data verifier 144 can retrieve this information from the database 148 and, as network traffic is received from another controller 140 during a simulation, the simulation data verifier 144 can compare the received data to the expected data. As discussed above, the application associated with a particular simulation can impact the expected responses for the simulation, as the higher level application data is more important than the lower level packet data. For example, for an HTTP simulation, the simulation data verifier 144 can be configured to ignore the information contained in packet headers and instead may only examiner the body of response packets, because the packet headers may be altered in various ways by intermediary devices in the enterprise network. The metadata generator 146 can receive the results of the comparisons performed by the simulation data verifier 144, and can produce metadata based on the results. For example, in some implementations, the metadata generator 146 can generate a flag indicating a mismatch for each instance of network traffic received from another controller 140 that does not match the data that was expected to be received. The simulation data transceiver 142 can send the metadata produced by the metadata generator 146 to the planner 115 after the simulation has been completed, so that the planner 115 can use the metadata to analyze the results of the simulation as discussed above.

Figure 2:
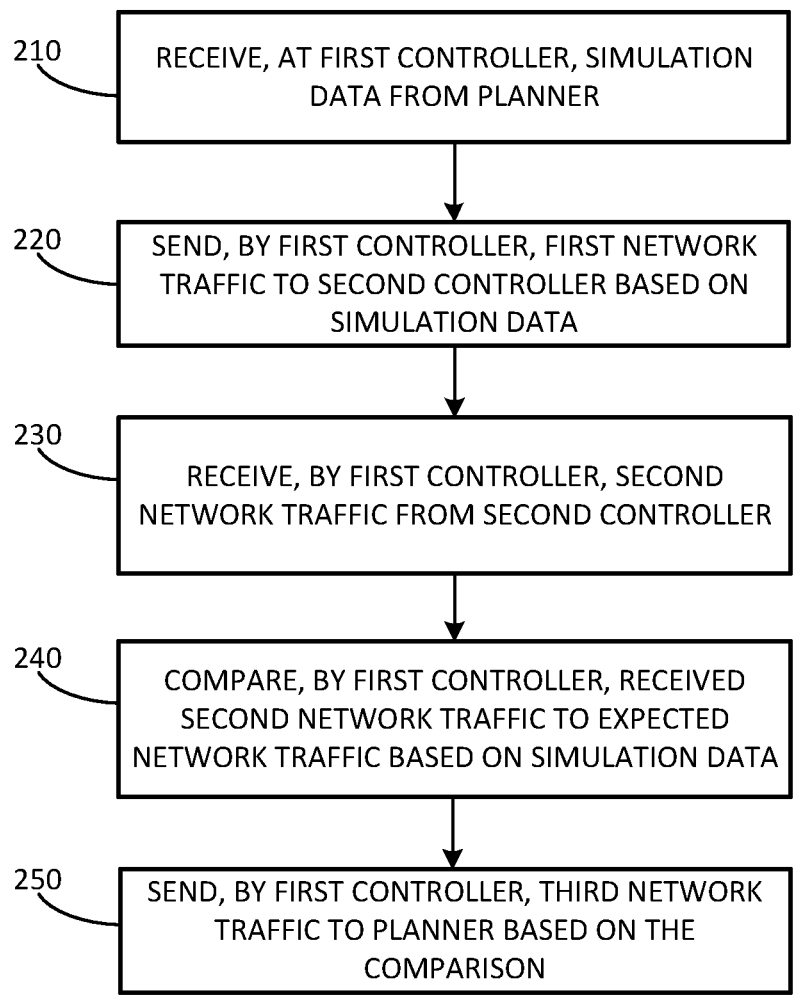
FIG. 2 is a flowchart of an example method for evaluating security in a computer network.

FIG. 2 is a flowchart of an example method 200 for evaluating security in a computer network. In brief overview, the method 200 includes receiving, at a first controller, simulation data from a planner (step 210), sending, by the first controller, first network traffic to a second controller based on the simulation data received from the planer (step 220), receiving, by the first controller, second network traffic from the second controller (step 230), comparing the received second network traffic to expected network traffic based on the simulation data (step 240), and sending, by the first controller, third network traffic to the planner based on the comparison of the received second network traffic to the expected network traffic (step 250).

Referring again to FIG. 2, and in greater detail, the method 200 includes receiving, at a first controller, simulation data from a planner (step 210). In some implementations, the first controller can be positioned within a selected zone of an enterprise network, such as the enterprise network 105 shown in FIG. 1A, or outside of the enterprise network, such as in the external cloud network 110 shown in FIG. 1A. The planner also can be located either within the enterprise network, or can be outside of the enterprise network in a remote cloud network. The simulation data can include information such as the sequence of network packets that should be sent from the first controller during the simulation, as well as metadata that can facilitate execution of the simulation, such as data indicating the types of responses that should be received during the simulation and data indicating the destination to which network traffic should be sent during the simulation. In some implementations, the simulation data also can include management data associated with a second controller to be involved in the simulation. As discussed above, in some implementations, all of the management data for a simulation can be sent to a single controller, and that controller can disseminate the appropriate portions of the management data to the second controller involved in the simulation. In some implementations, the first controller can include an interface dedicated to receiving such simulation data from the planner.

The method 200 also includes sending, by the first controller, first network traffic to a second controller based on the simulation data received from the planer (step 220). As discussed above, the simulation data can include metadata including an indication of a destination for the first network traffic, as well as actual data to be sent. The first controller can parse the simulation data to determine the first network data and the intended destination. In some implementations, the first controller can create a stateful, routable socket between itself and the second controller. For example, the first controller can include software configured to handle various types of proxies (with and without authentication) firewalls, network address translation (NAT), or any other type of network configuration that devices in the enterprise network must interact with in order to send and receive network traffic. Thus, the first controller can interact with the second controller in a manner similar to that which would be used by any other form of production equipment, such as workstations and servers, within the enterprise network. This arrangement can increase the realism of a simulation. After the first controller establishes a connection with the second controller, the first controller can begin sending the first network traffic to the second controller. As discussed above the first network traffic can be indistinguishable from actual malicious data that would be sent during an attack. In some implementations, the first network traffic also may include simulation management data that provides instructions to the second controller regarding how to execute the attack simulation.

The method 200 also includes receiving, by the first controller, second network traffic from the second controller (step 230). In some implementations, the second network traffic can be sent responsive to the first network traffic. For example, the first network traffic can include a request sent from the first controller to the second controller, and the second controller can be configured to send the second network traffic representing a response to the request.

The method 200 also includes comparing, by the first controller, the received second network traffic to expected network traffic based on the simulation data (step 240). As discussed above, the first controller may store metadata indicating the responses that it expects to receive from the second controller. After the second network traffic is received from the second controller, the first controller can compare the received second network traffic to expected network traffic to determine a match or mismatch. A match may be determined if, for example, a source address of the second network traffic matches the expected source address and the payload of each packet in the second network traffic matches the expected packet payloads. Otherwise, a mismatch may be determined if the second network traffic did not originate at the expected destination or did not include the expected packet payloads. For example, a mismatch may occur when a security mechanism positioned between the first and second controllers, such as a firewall or IPS, intervenes to drop packets associated with the second network traffic in a response to a determination that the second network traffic may be malicious.

The method 200 also includes sending, by the first controller, third network traffic to the planner based on the comparison of the received second network traffic to the expected network traffic (step 250). In some implementations, the first controller may generate metadata based on the comparison performed in step 240. For example, if a mismatch is determined, the first controller may generate metadata including an indication of why the mismatch occurred (e.g., whether the mismatch was a result of an incorrect source address or an incorrect packet payload), as well as additional data such as the time at which the mismatch occurred. All of this information can be sent to the planner by the first controller.

In some implementations, the planner also can receive similar metadata from the second controller and from a SIEM device that aggregates data from the various security mechanisms in the enterprise network. Based on this data received by the planner, the planner can generate simulation results that provide an indication of how the network responded to the simulated attack. Because the planner receives data from many different devices in the enterprise network, the planner can analyze the received data to determine holistically how the enterprise network handled the simulation. For example, the planner can determine not only how the endpoints (i.e., the first and second controllers) responded during the simulation, but also whether and how any intermediary devices, such as firewalls and IPSs, intervened to prevent or detect the simulated attack. The planner can then aggregate this data to provide an administrator with a complete description of how the enterprise network responded to the attack. In some implementations, the planner may provide the simulation results to the administrator using one or more graphical user interfaces. Examples of such graphical user interfaces are described further below.

In some implementations, the process 200 can be repeated multiple times in the enterprise network to simulate different types of attacks. For example, the process 200 can be repeated using a different set of controllers as the first and second controllers, in order to simulate an attack between a different pair of endpoints. In this way, an administrator can run configurable attack simulations across various paths through the network, to gain a holistic understanding of the security posture of the network. In some implementations, the process 200 may be repeated on a periodic basis, so that simulations are run over time to ensure that the security posture of the enterprise network is understood over time as network configurations may change. In some other implementations, the process 200 may be repeated when triggered by an event, such as a reconfiguration of a security mechanism. For example, an administrator may run a simulation that identifies a security flaw, and may subsequently update the configuration of one or more security mechanisms in the enterprise network to attempt to fix the flaw. In order to confirm whether the configuration change corrected the flaw, the simulation can be run again after the reconfiguration of the one or more security mechanisms, and the result of the second simulation can help the administrator to understand whether the reconfiguration actually corrected the flaw identified in the first simulation.

B. Graphical User Interfaces (GUIs)

Figure 3:
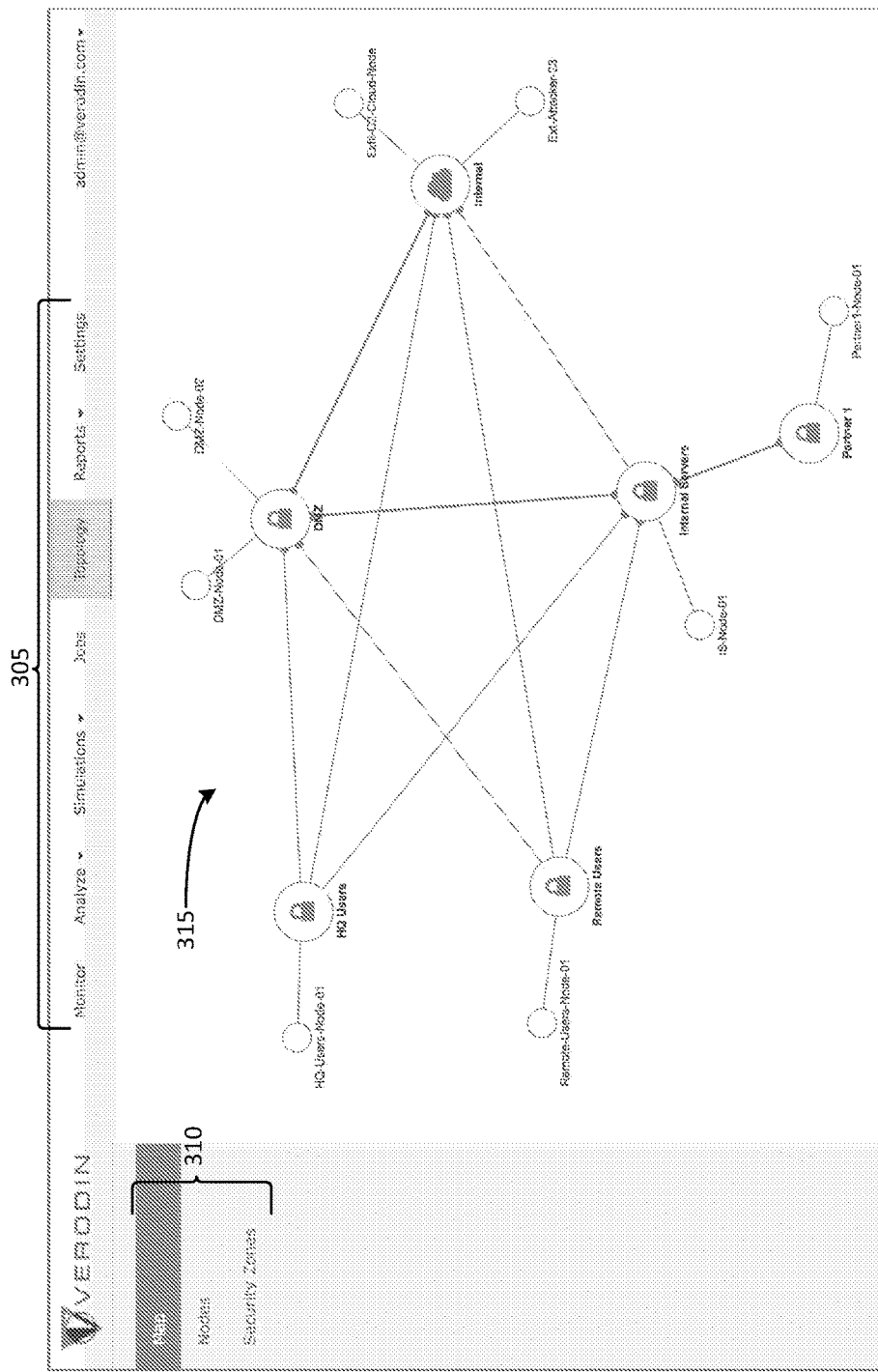
FIG. 3 is an example graphical user interface for displaying a network topology.

FIG. 3 is an example graphical user interface (GUI) 300 for displaying a network topology. In some implementations, the GUI 300 can be generated by a central device such as the planner 115 shown in FIG. 1A. The GUI 300 includes a top menu bar 305, a side menu bar 310, and a network diagram 315. As shown, the "topology" tab of the top menu bar 305, and the "map" tab of the side menu option, can be selected by a user to cause the network diagram 315 to be displayed. In some implementations, the network diagram 315 can be a visual representation of an enterprise network whose security posture is tested by the planner and a plurality of controllers. The network diagram 315 can show the various network zones that exist with the enterprise network, such as the DMZ zone, the HQ users zone, the Remote Users zone, and the Internal Servers zone. In addition, the network diagram 315 can include various nodes within each zone, and each node can represent a controller configured to execute simulations of attacks and other malicious behavior as discussed above.

Links in the network diagram 315 can be used to show all of the available communication paths within the enterprise network, so that simulations can be executed along paths that actually exist within the enterprise network. For example, the network diagram 315 shows that a direct network path exists between the HQ Users zone and the Internal Servers zone, but that there is no direct path between the HQ Users zone and the Remote Users zone. In some implementations, the planner can use this information to determine the paths to be used for simulations. For example, if the planner intends to execute a simulated attack between the HQ Users zone and the Remote Users zone, an intermediary point for simulation data will have to be selected to accurately simulate the flow of traffic in the enterprise network, because there is no direct path between the HQ Users zone and the Remote Users zone.

Figure 4:
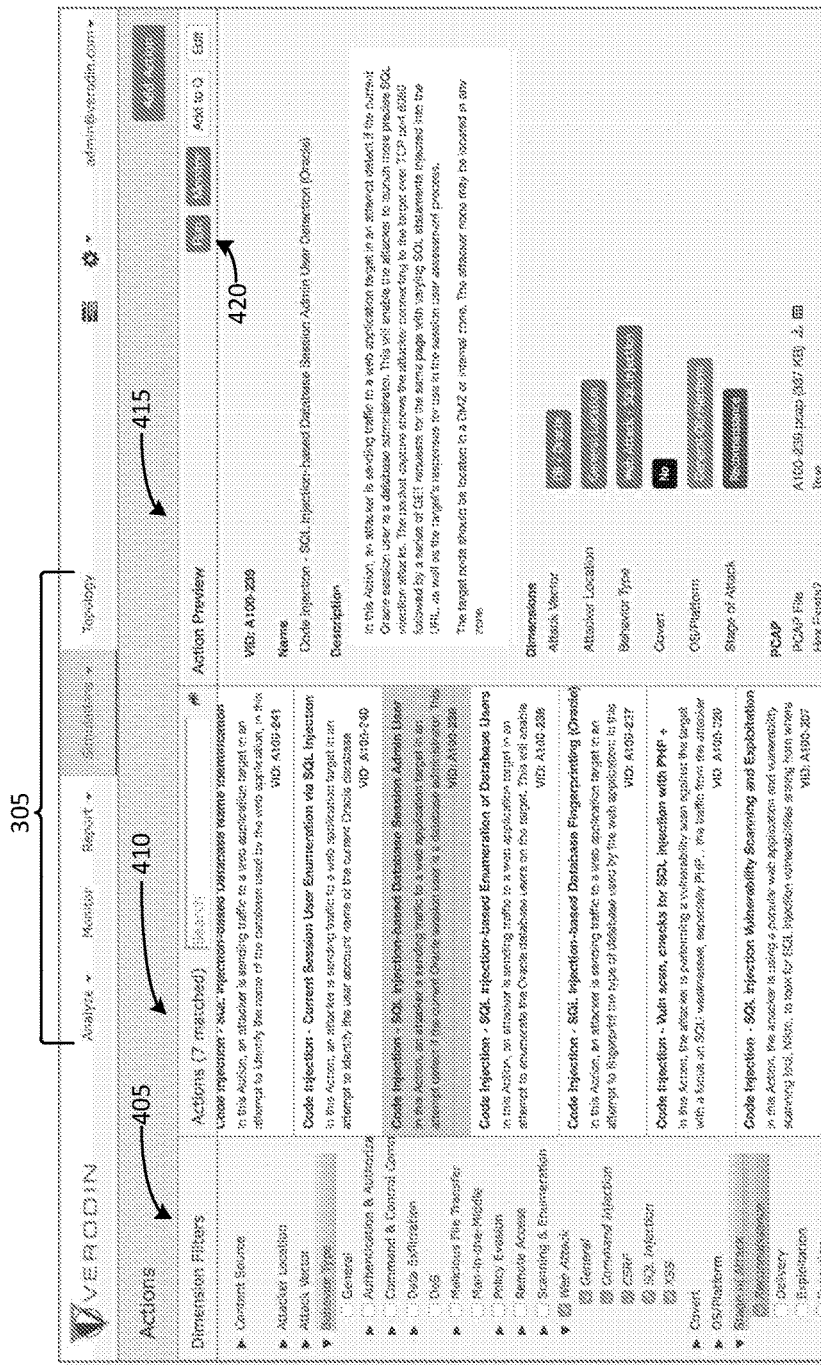
FIG. 4 is an example graphical user interface for selecting a particular malicious behavior to be simulated in a computer network.

FIG. 4 is an example GUI 400 for selecting a particular malicious behavior to be simulated in a computer network. The GUI 400 includes the top menu bar 305 (similar to that shown in FIG. 3), a dimension filters menu 405, an actions menu 410, and an action preview pane 415. As shown, the "simulations" tab of the top menu bar can be selected in order to cause the other menus shown in FIG. 4 to be displayed. The dimension filters menu 405 includes a behavior type dropdown menu, which displays a number of a different malicious behavior types that can be simulated to test how a network responds to each type of malicious behavior. Each of the behavior types may include sub-behavior types. For example, the web attack behavior type includes sub-behavior types for general, command injection, CSRF, SQL injection, and XSS. A user may select any number of the behavior types from the dimension filters menu 405, and information corresponding to each selected behavior type is then display in the actions menu 410. For example, the actions menu 410 can display particular types of attacks that correspond to the selected behavior types. Selecting a particular action from the actions menu can cause additional details about that action to be selected in the action previous menu 415. To run a simulation based on the selected action, a user can select the run button 420.

Figure 5:
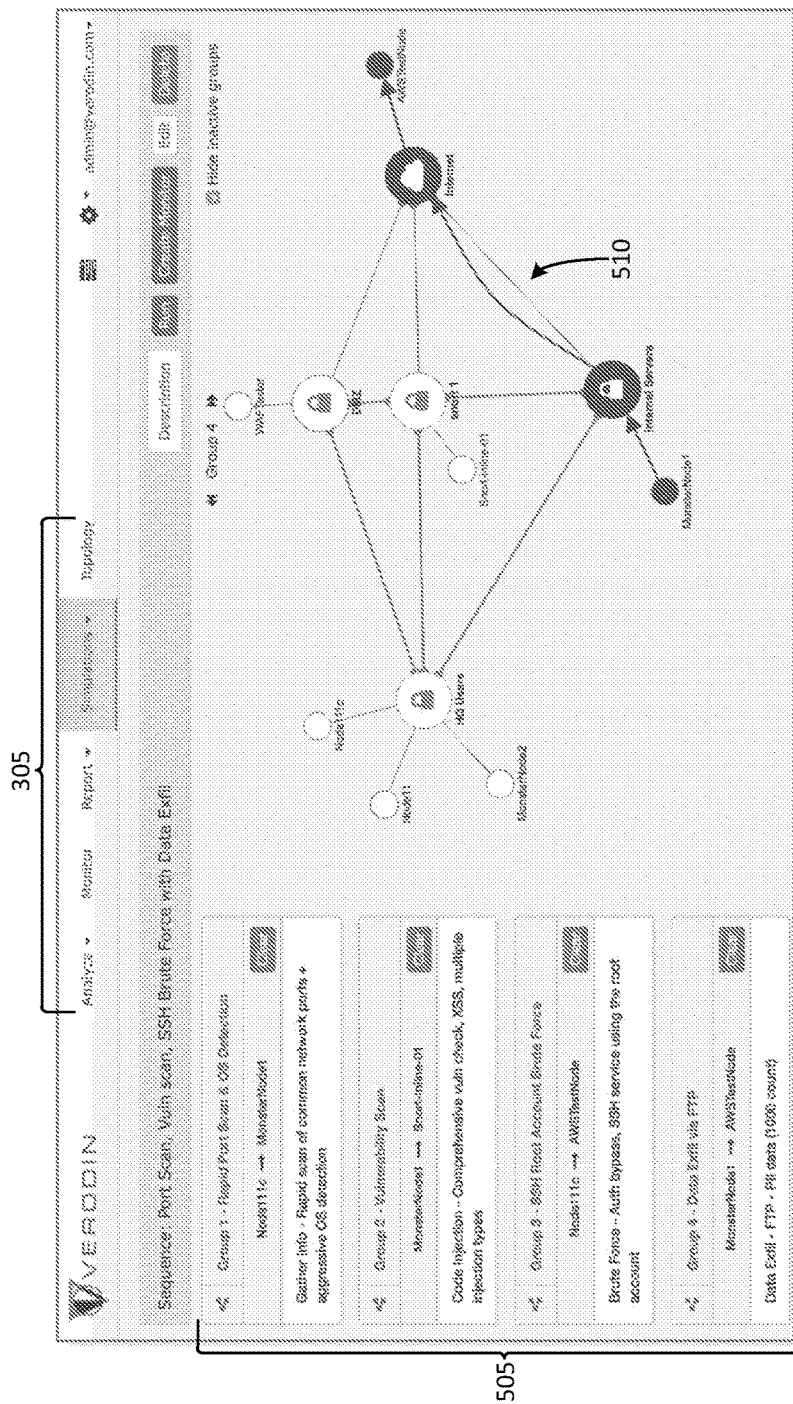
FIG. 5 is an example graphical user interface for displaying an attack sequence and an associated path through a computer network.

FIG. 5 is an example GUI 500 for displaying an attack sequence and an associated path through a computer network. After a sequence of one or more attacks is selected using the GUI 400 shown in FIG. 4, the GUI 500 can be generated to display additional information about the attack sequence. The GUI 500 includes the top menu bar 305, a sequence menu bar 505, and a network diagram 510. The sequence menu 505 shows an ordered list of the types of attacks to be simulated in the enterprise network. From the sequence menu 505, a user may view details regarding the sequence of attacks to be run, and may remove and reassign the controllers associate with the sequence by selecting the "clear" button associated with the particular attacks. The network diagram 510 highlights the network path across which the simulations associated with the attack sequence will be run. For example, as shown in FIG. 5, the attack sequence displayed in the sequence menu 505 is to be run along a path from a node in the Internal Servers zone (labeled MonsterNode1), through the Internet to a remote node labeled AWSTestNode.

In some implementations, the GUI 500 can be used to perform a configurable sequence of attack simulations in the network. For example, multiple attack groups can be selected to be simulated across multiple network paths, and the timing of each attack sequence may be specified or may be conditioned as dependent upon the outcome of previous attacks. In one example, the groups of attacks shown in the sequence menu 505 can be selected to be performed along the highlighted path of the network 510, and additional groups of attacks may be selected to be performed along the same or different network paths. In some implementations, after the first attack sequence, in which the AWSTestNode is the intended target, has completed, a second attack sequence can be performed in which the AWSTestNode is the attacker. Such an attack sequence can be used to simulate a scenario in which an attacker takes control of the AWSTestNode computing device, and subsequently uses the AWSTestNode computing device to initiate future attacks against other nodes in the network.

In the example discussed above, the second attack sequence may be selected or configured to target a node having an operating system different from the operating system associated with either or both of the MonsterNode1 and the AWSTestNode. For example, the MonsterNode1 may be associated with a Linux operating system, and the AWSTestNode may be associated with a MAC OS X operating system. Thus, the first attack executed between these nodes may take this information into account, for example by attempting to exploit a flaw known to exist in the operating system of the target node (i.e., the AWSTestNode). A subsequent simulated attack sequence made from the AWSTestNode may be selected or configured to target a node having a different operating system, such as Windows, and the subsequent attack sequence may therefore differ from the first attack sequence in that the subsequent attack sequence is configured to exploit a flaw known to exist in the Windows operating system. In some implementations, all of the information for multiple attack sequences can be downloaded by the controllers in the network from the planner before the attack simulations are begun. Thus, the controllers can already have the information required to execute a complex series of attack sequences one after another, without requiring additional time to download the necessary simulation data from the planner.

In some implementations, an administrator may specify a time delay between the completion of a first attack sequence and the beginning of a second attack sequence, or between the completion of any individual events within a given attack sequence. Thus, in the example discussed above, the ASWTestNode may wait a predetermined amount of time after the first attack sequence before initiating a second attack sequence against another node in the network 510. In some other implementations, the administrator may condition the execution of the second attack sequence on a particular result of the first attack sequence. For example, the administrator may specify that the second attack sequence is only to be performed if the first attack sequence is not detected or blocked by security mechanisms in the network 510. In still other implementations, the administrator may configure a sequence of attacks to be performed according to various policies. For example, such policies may take into account factors such as the duration of an earlier attack, the outcome of an earlier attack, the zones in which the attacker and target for an earlier attack were located, or the time of day at which an earlier attack was successfully executed.

In some implementations, the GUI 500 can be used to ensure that only a subset of node pairings can be selected for a given attack. For example, the GUI 500 can show the network links that actually exist in the enterprise network, and can prevent an attack simulation from being performed between two nodes that are not joined by a network link. Thus, in the example network 510 shown in FIG. 5, the MonsterNode1 cannot execute an attack simulation directly with the AWSTestNode1 without also going through the Internet network, because no such path exists in the network 510.

Figure 6:
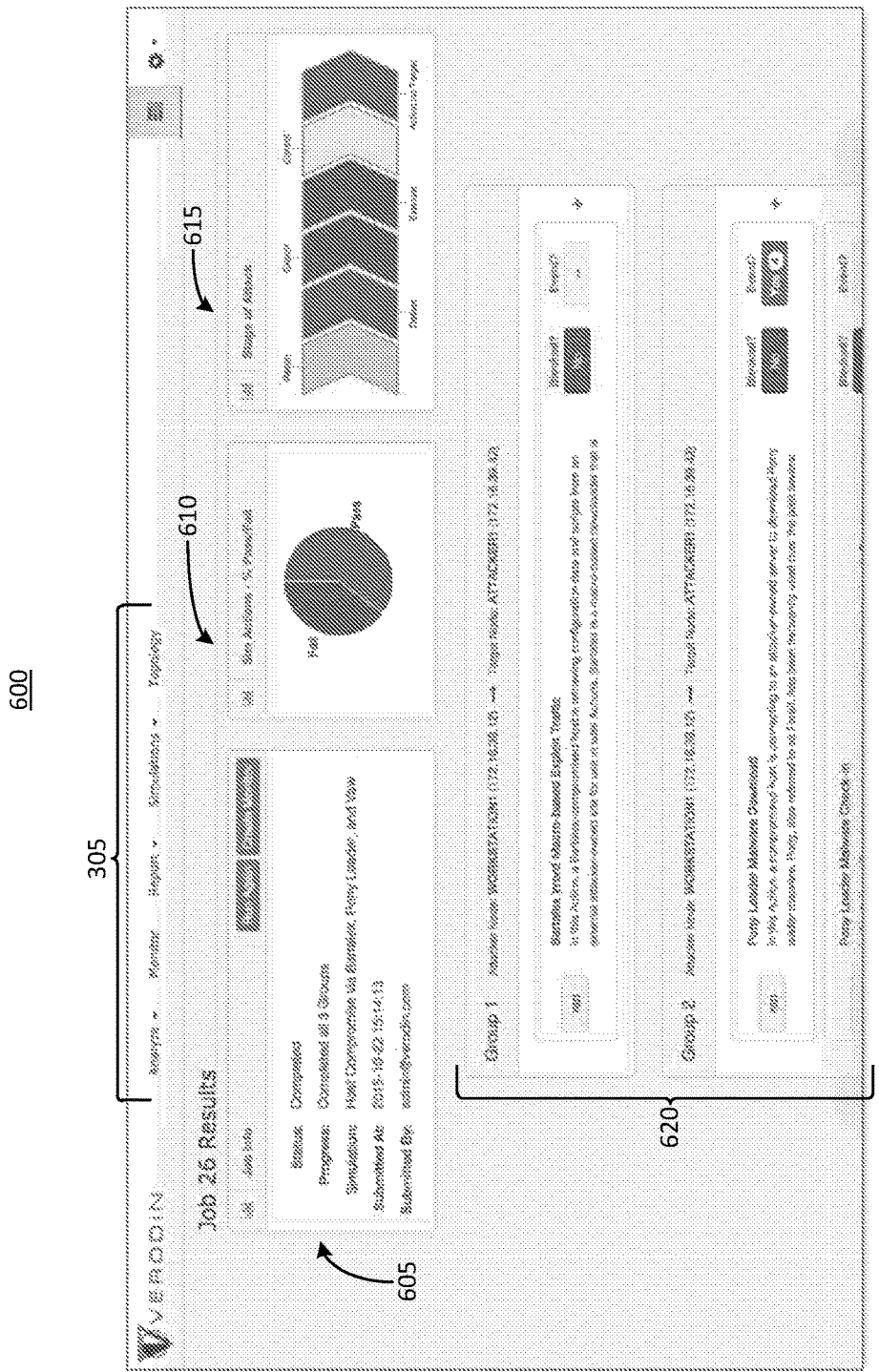
FIG. 6 is a first example graphical user interface for displaying results of an attack sequence simulation in a computer network.

FIG. 6 is a first example GUI 600 for displaying results of an attack sequence simulation in a computer network. The GUI 600 can be displayed, for example, after the attacks shown in the GUI 500 of FIG. 5 have been run. The GUI 600 includes a job info menu 605, a sim actions menu 610, a stage of attack menu 615, and a group menu 620. The job info menu 605 provides an overview of the results for the attack sequence, including its status as complete or incomplete, a name for the simulation sequence, a time at which the simulation was submitted, and an identification of the administrator who submitted the attack sequence. The sim actions menu 610 shows a graphical representation (e.g., a pie chart) or the number of simulated attacks that passed (i.e., were detected or blocked) and the number of simulated attacks that failed (i.e., were executed in the enterprise network but were not detected or blocked). The stage of attack menu 615 shows the various stages of each attack, including stages corresponding to recon, deliver, exploit, execute, control, and action on target. For each stage, the stage of attack menu displays a color that may indicate whether the enterprise network properly defended against that particular stage of attack. For example, green may indicate that the attack was successfully blocked at a particular stage. The group menu 620 can display a list of each group of attacks that was run during a simulation, as well as in indication of whether each group of attacks was successfully blocked and whether each group of attacks generated a security event (e.g., a detection of malicious traffic by a security mechanism in the enterprise network).

Figure 7:
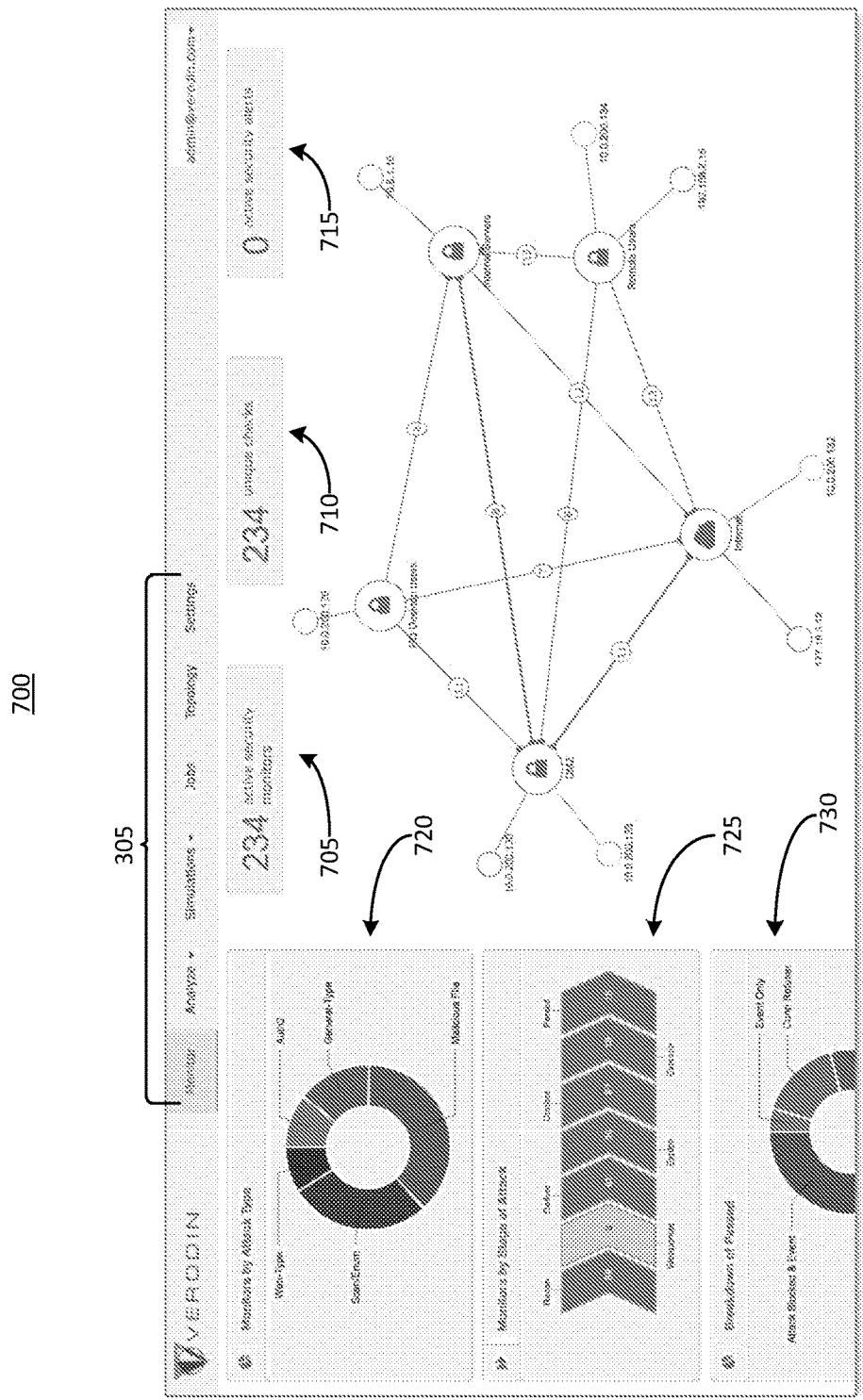
FIG. 7 is a second example graphical user interface for displaying results of an attack sequence simulation in a computer network.

FIG. 7 is a second example GUI 700 for displaying results of an attack sequence simulation in a computer network. The GUI 700 includes an active security monitors indication 234, a unique checks indication 710, and an active security alerts indication 715. In addition, the GUI 700 includes a menu 720 for displaying the monitors by attack type, a menu 725 for display the monitors by attack stage, and a menu 730 for displaying additional information for those simulations that passed. The menu 720 provides a pie chart showing the relative proportion of security monitors in the network for handling various types of attacks, including web-type attacks, scan/enum attacks, malicious file attacks, general type attacks, and auth2 attacks. The menu 725 includes an indication of the number of monitors that are configured to detect or block various stages of an attack, including recon, weaponize, deliver, exploit, control, execute, and persist stages. Each stage includes a numeric value representing the number of active monitors for that stage. The menu 730 displays a pie chart showing the relative proportion of ways in which simulations generated a passing result in the enterprise network. For example, simulations may generate a passing result by refusing a connection associated with a simulated attack, by generating an event such as a flag indicating that an attack likely took place, or by generating an event and also blocking the attack that corresponds to the event.

Figure 8:
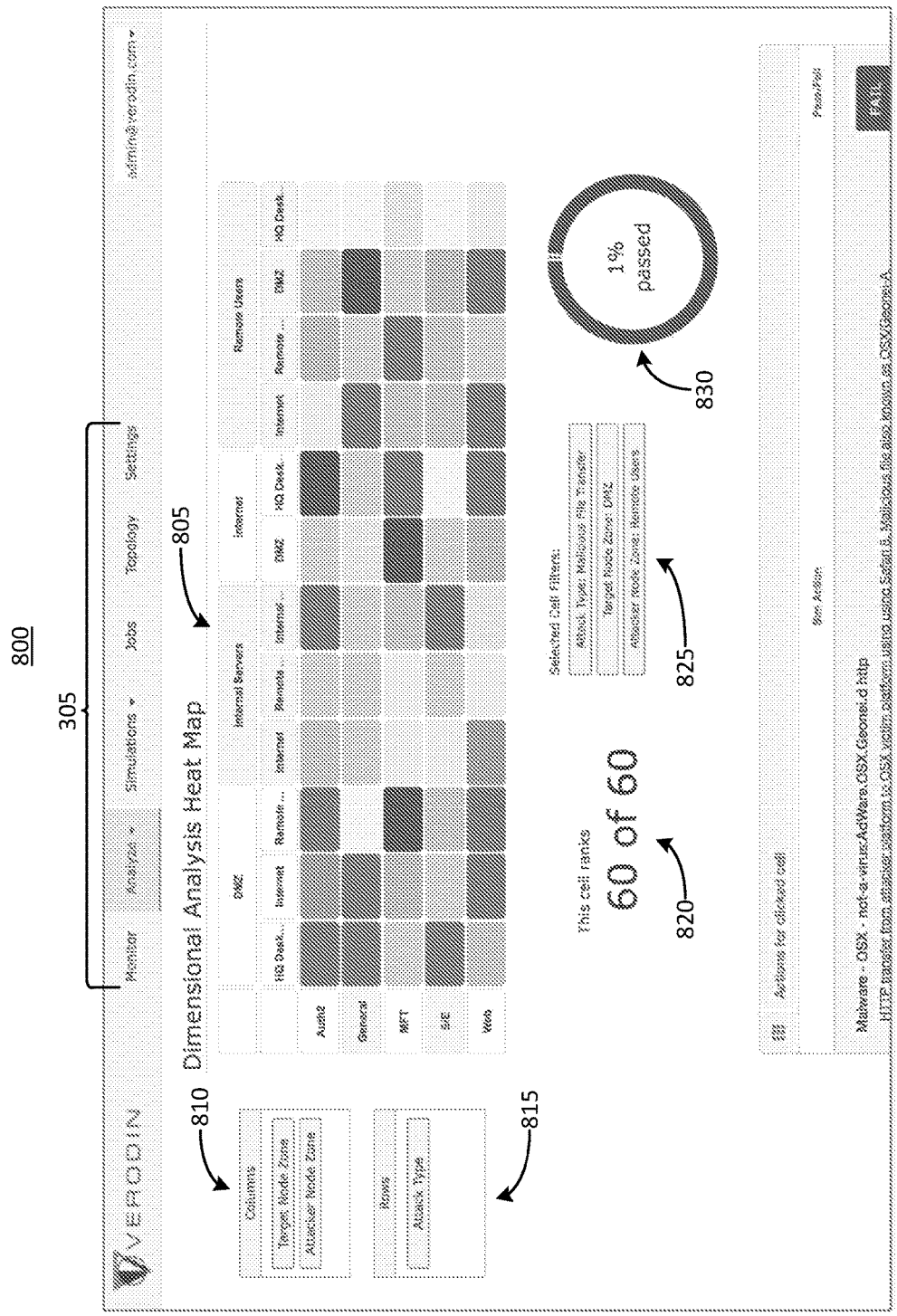
FIG. 8 is a third example graphical user interface for displaying results of an attack sequence simulation in a computer network.

FIG. 8 is a third example GUI 800 for displaying results of an attack sequence simulation in a computer network. The GUI 800 includes a dimensional analysis heat map 805, a columns menu 810, a rows menu 815, a cell rank indication 820, a filter menu 825, and a passing percentage indication 830. The columns menu 810 and the rows menu 815 can include an indication of the labels for the columns and rows of the heat map 805, respectively. In the example shown in FIG. 8, the columns of the heat map 810 indicate the target and attacker nodes for a simulation, and rows indicate the type of attack for the simulation. The heat map 805 can include a cell for each row/column pair. Thus, each cell in the heat map corresponds to a particular attack type for a particular set of target and attack nodes. In some implementations, the color of each cell can correspond to the relative performance of that cell. For example, in some implementations, a lighter color may indicate that the cell represents a type of attack and set of node pairs for which a relatively large percentage of simulations passed, while a darker color may indicate that the cell represents a type of attack and set of node pairs for which a relatively small percentage of simulations passed. Cells can be selected by a user, and the relative rank of the selected cell can be displayed in the cell rank indication 820. The user also can customize the heat map 805 by selecting various filters in the cell filter menu 825. The passing percentage 830 displays a pie chart showing the relative percentage of simulations that passed as compared to those that failed.

Figure 9:
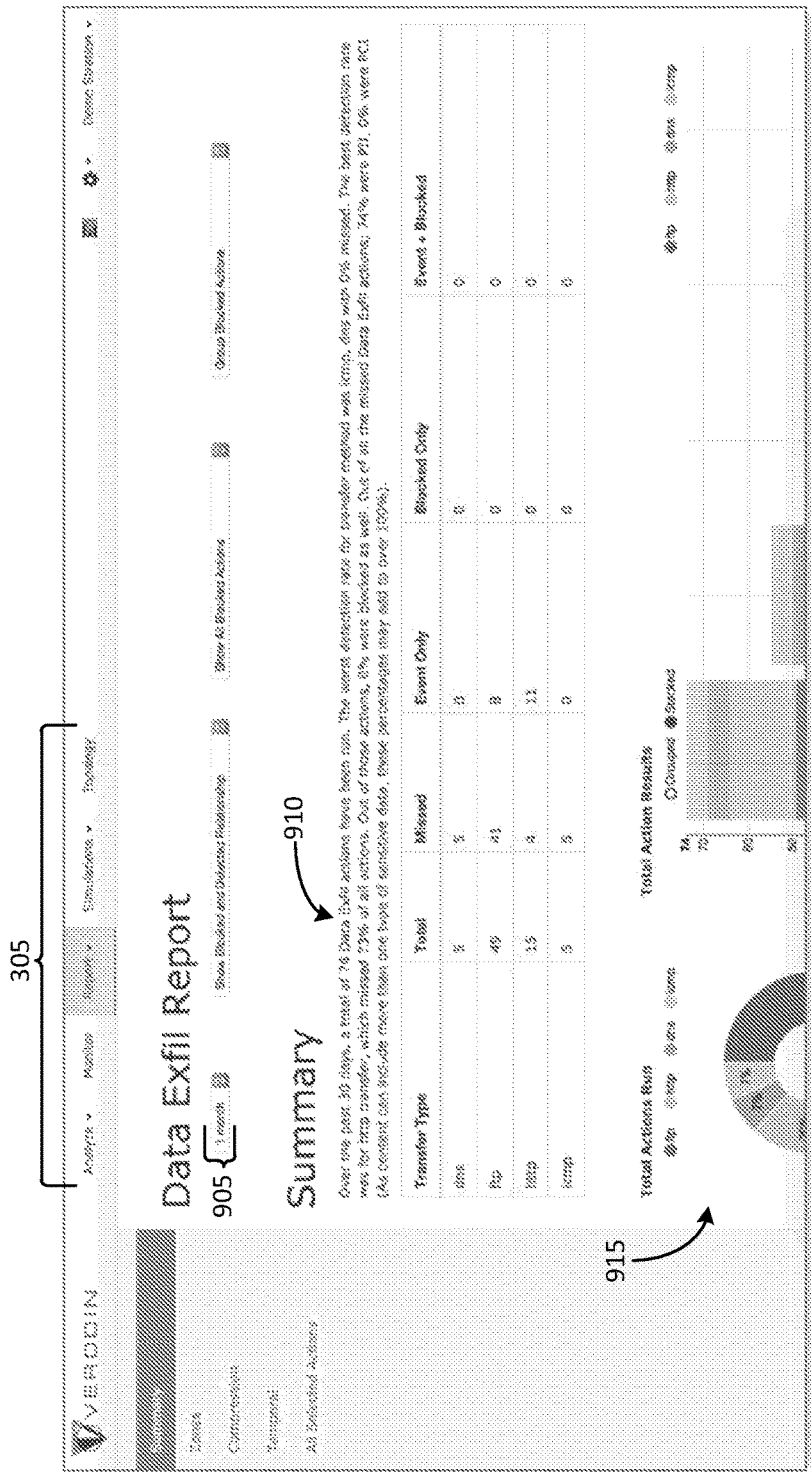
FIG. 9 is a fourth example graphical user interface for displaying results of an attack sequence simulation in a computer network.

FIG. 9 is a fourth example GUI 900 for displaying results of an attack sequence simulation in a computer network. The GUI 900 includes a series of reporting options 905, a summary 910, and a total actions run menu 915. The reporting options menu 905 can include a plurality of dropdown options for customizing the results that are displayed by the GUI 900. For example, the reporting options menu 905 can allow a user to select a time frame as well as the types of results to be displayed for that time frame. The summary 910 can include information relating to the number of simulations that have been run and the detection rate for various types of simulations based on the method they used to transfer data. The total actions run menu 915 can display a pie chart showing the relative proportions of simulations run for each transfer method.

C. Controller-to-Controller Communication

As described above, a system such as the system 100 shown in FIG. 1 can be configured to facilitate comprehensive evaluation of the security posture of the production network. In some implementations, testing of the security posture of the production network can be carried out by a planner and one or more controllers. Because the controllers are positioned within the enterprise network, the tests performed by the controllers can accurately reflect the complexity of the enterprise network better than isolated laboratory testing of individual components taken out of the network topology. Furthermore, because tests do not rely on communications between the production computing devices in the production network, the production computing devices are never put at risk during testing. In some implementations, the controllers serve only to test the security of the enterprise network, and may not be used for typical day-to-day operations of the production network.

Figure 10:
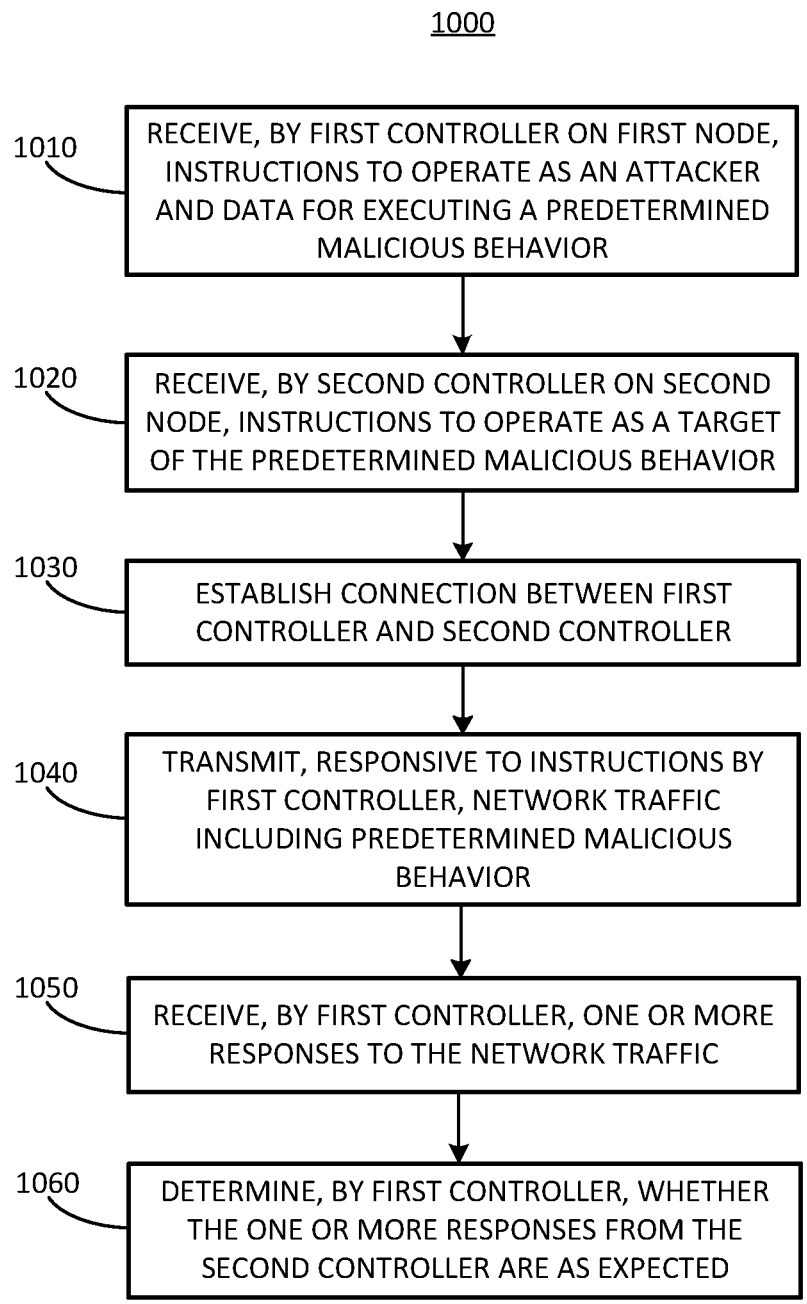
FIG. 10 is a flowchart of an example method for controlling execution of malicious behavior in a production network to test a security system of the production network.

FIG. 10 is a flowchart of an example method 1000 for controlling execution of malicious behavior in a production network to test a security system of the production network. In brief overview, the method 1000 includes receiving, by a first controller on a first node in a production network with a security system, instructions to operate as an attacker and data for executing a predetermined malicious behavior on the production network (step 1010). A second controller on a second node receives, from the planner, instructions to operate as a target of the predetermined malicious behavior by the attacker (step 1020). The method 1000 includes establishing a connection between the first controller and the second controller (step 1030). The method 1000 includes transmitting, responsive to the instructions by the first controller via the connection to the second controller via at least a portion of the security system of the production network, network traffic comprising the predetermined malicious behavior and generated using the data (step 1040), receiving, by the first controller via the connection from the second controller, one or more responses to the network traffic (step 1050), and determining, by the first controller, whether the one or more responses from the second controller are as expected (step 1060).

Referring again to FIG. 10, and in greater detail, the method 1000 includes receiving, by a first controller on a first node in a production network with a security system, instructions to operate as an attacker and data for executing a predetermined malicious behavior on the production network (step 1010). In some implementations, the production network can be a network similar to the enterprise network 105 shown in FIG. 1A, and the first controller can be any of the controllers 140*a*-140*d* located within the network 105. The first controller can receive the instructions from a planner, such as the planner 115 shown in FIG. 1A. In some implementations, the planner can be positioned outside of the production network as illustrated in FIG. 1A. However, in other implementations, the planner also can be included within the production network. The instructions can include any type and form of data relating to the malicious behavior to be carried out by the controller, which may correspond to various types of cyber attacks. For example, the instructions can include one or more requests for the first controller to execute the malicious behavior, including information such as a sequence of network packets that should be sent from the first controller during the performance of the malicious behavior. The instructions also can include metadata that can facilitate execution of the malicious behavior. Such metadata can be any form data indicating the types and/or content of one or more responses that the first controller should expect to receive, as well as data indicating the destination to which network traffic should be sent during the malicious behavior (i.e., a network address associated with a second controller). In some implementations, the instructions also can include management data associated with a second controller to be involved in the execution of the malicious behavior.

At step 1020 of the method 1000, a second controller on a second node receives, from the planner, instructions to operate as a target of the predetermined malicious behavior by the attacker (i.e., the first controller on the first node). As described above, the second controller can be any of the controllers 140*a*-140*d* in the enterprise network 105 shown in FIG. 1A. In some implementations, the second controller can be a controller located within a different zone than the first controller. For example, such an arrangement can allow for the testing of a malicious behavior across different zones of the network requiring the transmission of data packets through various networking and security devices, such as the IPSs 155, the firewalls 150, and the router 145 shown in FIG. 1A. The second controller can receive instructions that are similar (or complimentary) to the instructions received by the first controller in step 1010. For example, the instructions can include information such as a sequence of network packets that are to be received from the first controller during the performance of the malicious behavior by the first controller, as well as one or more responses that the second controller should transmit to the first controller in response.

The method 1000 includes establishing a connection between the first controller and the second controller (step 1030). In some implementations, the connection between the first controller and the second controller can be established based at least in part on the type of malicious behavior that the first controller has been instructed to perform. For example, the malicious behavior may require a particular type of connection. In some implementations, the malicious behavior may require a secure connection between the first controller and the second controller. Thus, the established connection can be a secure connection such as a secure shell (SSH) connection or a secure hypertext transfer protocol (HTTPS) connection. In some implementations, the connection can be a stateful connection. For example, the first controller can be configured to handle various types of proxies, firewalls, network address translation (NAT), or any other type of network configuration that a device in the production network must interact with in order to send and receive network traffic. Thus, the first controller can interact with the second controller in a manner similar to that which would be used by any other form of production equipment, such as workstations and servers, within the production network. In some implementations, the connection can be an encrypted connection. In some other implementations, any other type or form of connection can be established. Regardless of the type of connection established, the connection can allow an attack to be replicated between the first controller and the second controller, as described below.

The method 1000 includes transmitting, responsive to the instructions by the first controller via the connection to the second controller via at least a portion of the security system of the production network, network traffic comprising the predetermined malicious behavior and generated using the data (step 1040). The instructions that the first controller received at step 1010 can include information including an indication of a destination for the first network traffic (i.e., the second controller), as well as the actual data to be sent. The first controller can parse this information to determine the network traffic and the intended destination, and can transmit the network traffic, for example via a network interface included within the first controller. In some implementations, the network traffic can be indistinguishable from actual malicious data that would be sent during an attack. For example, the network traffic can include a request for the second controller to perform the malicious behavior under test.

The method 1000 includes receiving, by the first controller via the connection from the second controller, one or more responses to the network traffic (step 1050). In some implementations, the second controller can send the one or more responses based in part on the network traffic it received from the first controller. For example, the network traffic sent by the first controller can include a request, and the second controller can be configured to send the one or more responses in response to the request. In some implementations, the second controller can generate the one or more responses based in part on the instructions it received (e.g., from the planner) in step 1020.

The method 1000 also includes determining, by the first controller, whether the one or more responses from the second controller are as expected (step 1060). In some implementations, the first controller can make this determination based on a comparison of the one or more responses with data received from the planner in step 1010. For example, as discussed above, the instructions received at the first controller in step 1010 can include expected response data corresponding to the responses that the first controller expects to receive from the second controller. After the one or more responses are received from the second controller in step 1050, the first controller can compare the one or more responses to the expected data to determine whether the one or more responses are as expected. The first controller can determine that the one or more responses are as expected if, for example, a source address of the responses matches an expected source address and if the payload of each packet in the one or more responses matches expected packet payloads. On the other hand, the first controller can determine that the one or more responses are not as expected if the one or more responses did not originate at the second controller or if they do not include the expected packet payloads. For example, a security mechanism positioned between the first and second controllers, such as a firewall or IPS, could intervene to drop packets associated with the second network traffic in a response to a determination that the second network traffic may be malicious, thereby leading to an unexpected response (or no response) at the first controller.

In some implementations, if the first controller determines a mismatch between the one or more responses and the expected response data, the first controller can be configured to generate metadata about the mismatch, and can communicate this metadata to the planner. In some implementations, both the first controller and the second controller can be configured to maintain the network traffic representing the malicious behavior between the first controller and the second controller, for example by storing some or all of the network traffic in respective memory elements on each of the first controller and the second controller. In some implementations, the method 1000 can be repeated multiple times. Repeating the method 1000 can allow the security posture of the production network to be continuously monitored, as configuration changes on any of the devices within the network may alter the security posture of the network over time. Thus, in some implementations, an administrator may configure the planner to perform the method 1000 with different pairs of controllers on a periodic basis.

D. Attack Simulation Sequences

Sophisticated malicious behavior in a computer network often relies on one or more sequences of multiple attacks. These attack sequences may occur between different node pairs and across different paths through the network. In addition, the results of an attack may impact the execution of a subsequent attack in the sequence. Thus, it can be difficult to test this type of complex malicious behavior in an isolated laboratory environment, as the conditional behavior that may depend on the results of attack sequences occurring across different node pairs and different network paths may not be readily replicated. To more fully test the security posture of a production network, attack simulation sequences can be run directly within the production network.

Figure 11A:
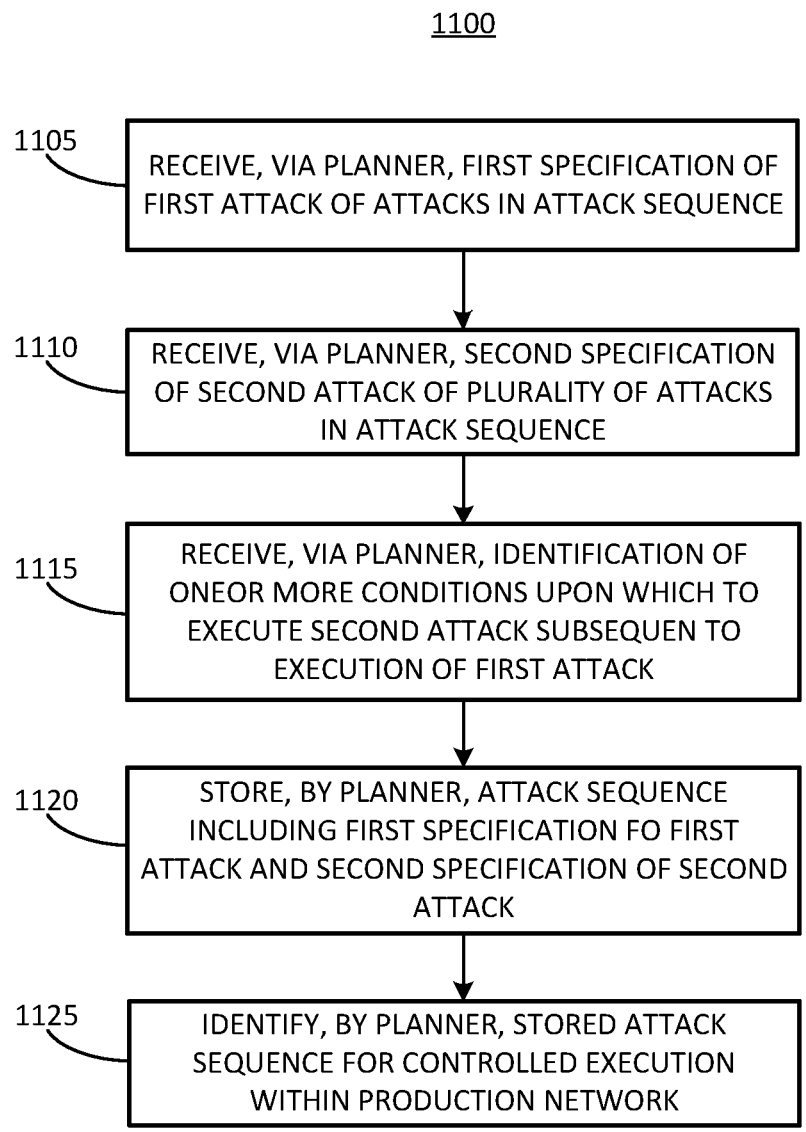
FIG. 11A is a flowchart of an example method for configuring a controlled execution of a sequence of attacks in a production network to test a security system.

FIG. 11A is a flowchart of an example method for configuring a controlled execution of a sequence of attacks in a production network to test a security system. In brief overview, the method 1100 includes receiving, via a planner, a first specification of a first attack of a plurality of attacks in an attack sequence (step 1105), receiving, via the planner, a second specification of a second attack of the plurality of attack in the attack sequence (step 1110), receiving, by the first controller, second network traffic from the second controller (step 1115), storing, by the planner, the attack sequence including the first specification of the first attack and the second specification of the second attack (step 1120), and identifying, by the planner, the stored attack sequence for controlled execution within the production network to test at least a portion of a security system (step 1125).

Referring again to FIG. 11A, and in greater detail, the method 1100 includes receiving, via a planner (e.g., the planner 115 in FIG. 1A), a first specification of a first attack (e.g., Group 1 in FIG. 5) of a plurality of attacks (e.g., Groups 1-4 in FIG. 5) in an attack sequence (e.g., an attack sequence of Groups 1-4 in the menu bar 505 in FIG. 5) (step 1105). In some implementations, referring to FIG. 5, the first specification (e.g., Group 1) can identify a first attack node (e.g., Node111c) and a first target node (e.g., MonsterNode1) in a production network, a first network path selected between the first attack node and the first target node, and a first predetermined malicious behavior (e.g., rapid port scan & OS detection). In some implementations, each of the first and second attack nodes may be a controller (e.g., the controllers 140 in FIG. 1A) deployed within a zone of the production network. In some implementations, the first specification of the first attack can be received by receiving a selection of the first network path via interaction with a graphical representation of links between nodes (e.g., the network diagram 510 in FIG. 5) in the production network.

The method 1100 also includes receiving, via the planner, a second specification of a second attack (e.g., Group 4 in FIG. 5) of the plurality of attack in the attack sequence (e.g., the attack sequence of Groups 1-4 in the menu bar 505 in FIG. 5) (step 1110). In some implementations, referring to FIG. 5, the second specification (e.g., Group 4) can identify a second attack node (e.g., MonsterNode1) and a second target node (e.g., AWSTestNode) in the production network, a second network path (e.g., MonsterNode1 to Internal Servers to Internet to AWSTestNode as shown in the network diagram 510) selected between the second attack node and the second target node, and a second predetermined malicious behavior (e.g., data exfiltration via FTP). In some implementations, referring to FIG. 5, the second specification (e.g., Group 4) can identify the second predetermined malicious behavior (e.g., data exfiltration via FTP) different than the first predetermined malicious behavior (e.g., rapid port scan & OS detection). In some implementations, the second specification can identify the second attack node and the second target node including types of operating systems (e.g., a MAC OS X operating system) different than at least one of the first attack node or the first target node (e.g., the Windows operating system).

The method 1100 also includes receiving, via the planner, identification of one or more conditions upon which to execute the second attack subsequent to execution of the first attack in the attack sequence (step 1115). For example, referring to FIG. 5, after the first attack (or attack sequence), in which the AWSTestNode is the intended target, has completed, a second attack (or a second attack sequence) can be performed in which the AWSTestNode is the attacker. Such an attack can be used to simulate a scenario in which an attacker takes control of the AWSTestNode computing device, and subsequently uses the AWSTestNode computing device to initiate future attacks against other nodes in the network.

In some implementations, the identification of the one or more conditions can be received by identifying the one or more conditions as a time duration between the first attack and the second attack. For example, referring to FIG. 5, the ASWTestNode may wait a predetermined amount of time after a first attack (or a first attack sequence) before initiating a second attack (or a second sequence) against another node in the network 510.

In some implementations, the identification of the one or more conditions can be received by identifying the one or more conditions as detection of one of failure of or success of the first attack. For example, the administrator may specify that the second attack (or attack sequence) is only to be performed if the first attack (or attack sequence) is not detected or blocked by security mechanisms in the network 510 (see FIG. 5).

The method 1100 also includes storing, by the planner (e.g., the planner 115), the attack sequence including the first specification of the first attack and the second specification of the second attack (e.g., Group 1 and Group 4 in FIG. 5) (step 1120). For example, the attack sequence can be received by the planner 115 and stored in the database 118 (see FIG. 1B).

The method 1100 also includes identifying, by the planner (e.g., the planner 115), the stored attack sequence for controlled execution within the production network to test at least a portion of a security system (step 1125). For example, referring to FIG. 1B, the simulation data manager 116 can retrieve an attack sequence from the database 118 and can process the attack sequence to generate simulation instructions that will cause the controllers 140 to send network traffic to replicate the attack upon a portion of a security system. In some implementations, all of the information for multiple attack sequences (e.g., the attack sequence shown in FIG. 5) can be downloaded by the controllers (e.g., the controllers 140a-140e in FIG. 1A) in the network from the planner before the attack simulations are begun. Thus, the controllers can already have the information required to execute a complex series of attack sequences one after another, without requiring additional time to download the necessary simulation data from the planner.

In some implementations, the method 1100 includes receiving a selection of a pairing of a first attack node and a second attack node or a paring of an attack node and a target node via interaction with a graphical representation of a topology of the production network. In some implementations, referring to FIG. 5, the GUI 500 can be used to ensure that only a subset of node pairings such that there exists a path in the network between each node pairing can be selected for a given attack. For example, in the example network 510 shown in FIG. 5, the pairing of MonsterNode1 (as an attack node) and AWSTestNode1 (as a target node) can be selected such that there exists a path between the two nodes in the network diagram 510. That is, the GUI 500 can show the network links that actually exist in the enterprise network, and can prevent an attack simulation from being performed between two nodes that are not joined by a network link. Thus, in the example network 510 shown in FIG. 5, the MonsterNode1 cannot execute an attack simulation directly with the AWSTestNode1 without also going through the Internet network, because no such path exists in the network 510. In some other implementations, the planner can receive the pairing of a first attack node and a second attack node or the pairing of an attacker node and a target node in a different manner that may not require any graphical representation of the topology of the production network. For example, the planner can receive this information by way of an API configured to allow a user (e.g., a network administrator) to select the pairing of a first attack node and a second attack node and/or the pairing of an attacker node and a target node, and to transmit this information to the planner, without the use of any graphical representation of the topology of the network. In some implementations, the pairs of nodes can be specified, for example, in a text-based format or other non-graphical format.

In some implementations, in a case where an attack sequence can be used to simulate a scenario in which an attacker (as a first attack node) takes control of a first computing device (as a first target node), and subsequently uses the same first computing device (as a second attack node) to initiate future attacks against other nodes (as a second target node) in the network, the pairing of the first attacker and the second attacker can be selected such that there exists a path between the two nodes in the network.

In some implementations, a system (e.g., the system 100 in FIG. 1A) for configuring a controlled execution of a sequence of attacks in a production network to test a security system can include a planner (e.g., the planner 115 in FIG. 1A) executable on a processor coupled to memory. In some implementations, the planner can be configured to receive a first specification of a first attack (e.g., Group 1 in FIG. 5) of a plurality of attacks in an attack sequence (e.g., an attack sequence of Groups 1-4 in the menu bar 505 in FIG. 5). In some implementations, the first specification (e.g., Group 1) can identify a first attack node (e.g., Node111c) and a first target node (e.g., MonsterNode1) in a production network, a first network path selected between the first attack node and the first target node, and a first predetermined malicious behavior (e.g., rapid port scan & OS detection). In some implementations, the first and second attack nodes may be controllers (e.g., the controllers 140 in FIG. 1A) deployed within the production network. In some implementations, the planner can be configured to receive a second specification of a second attack (e.g., Group 4 in FIG. 5) of the plurality of attack in the attack sequence (e.g., the attack sequence of Groups 1-4 in the menu bar 505 in FIG. 5). In some implementations, the second specification (e.g., Group 4 in FIG. 5) can identify a second attack node (e.g., MonsterNode1) and a second target node (e.g., AWSTestNode) in the production network, a second network path (e.g., MonsterNode1 to Internal Servers to Internet to AWSTestNode as shown in the network diagram 510) selected between the second attack node and the second target node, and a second predetermined malicious behavior (e.g., data exfiltration via FTP). In some implementations, each of the first and second attack nodes may be a controller (e.g., the controllers 140 in FIG. 1A) deployed within a zone of the production network. In some implementations, the planner can be configured to receive identification of one or more conditions (e.g., a scenario in which an attacker takes control of a first computing device, and subsequently uses the first computing device to initiate future attacks against other nodes in the network) upon which to execute the second attack subsequent to execution of the first attack in the attack sequence. In some implementations, the planner can be configured to store (e.g., in the database 118 in FIG. 1B) the attack sequence including the first specification of the first attack and the second specification of the second attack. In some implementations, the planner can be configured to identify the stored attack sequence (e.g., by retrieving from the database 118 in FIG. 1B) for controlled execution within the production network to test at least a portion of a security system.

In some implementations, the planner of the system can be further configured to receive a selection of a pairing of a first attack node and a second attack node or a pairing of an attacker node and a target node via interaction (e.g., MonsterNode1 and AWSTestNode1) with a graphical representation of a topology of the production network (e.g., the network diagram 510 in FIG. 5). For example, in the example network 510 shown in FIG. 5, the pairing of MonsterNode1 and AWSTestNode1 can be selected such that there exists a path between the two nodes exists in the network diagram 510. In some other implementations, the planner can receive the pairing of a first attack node and a second attack node or the pairing of an attacker node and a target node in a different manner that may not require any graphical representation of the topology of the production network, as described above.

In some implementations, the planner of the system can be further configured to receive a selection of a first network path (e.g., MonsterNode1 to Internal Servers to Internet to AWSTestNode1 in FIG. 5) via interaction with a graphical representation of links between nodes in the production network (e.g., the network diagram 510).

In some implementations, referring to FIG. 5, the planner of the system can be further configured to receive a second specification (e.g., Group 4) identifying a second predetermined malicious behavior (e.g., data exfiltration via FTP) different than a first predetermined malicious behavior (e.g., rapid port scan & OS detection in Group 1).

In some implementations, the planner of the system can be further configured to receive the second specification identifying the second attack node and the second target node including types of operating systems (e.g., a MAC OS X operating system) different than types of operating systems of at least one of the first attack node or the first target node (e.g., the Windows operating system).

In some implementations, the planner of the system can be further configured to receive identification of the one or more conditions as a time duration between the first attack and the second attack, e.g., a node may wait a predetermined amount of time after the first attack (or attack sequence) before initiating the second attack (or attack sequence) against another node in the network.

In some implementations, the planner of the system can be further configured to receive identification of the one or more conditions as detection of one of failure of or success of the first attack, e.g., the second attack is only to be performed if the first attack is not detected or blocked by security mechanisms in the network.

Figure 11B:
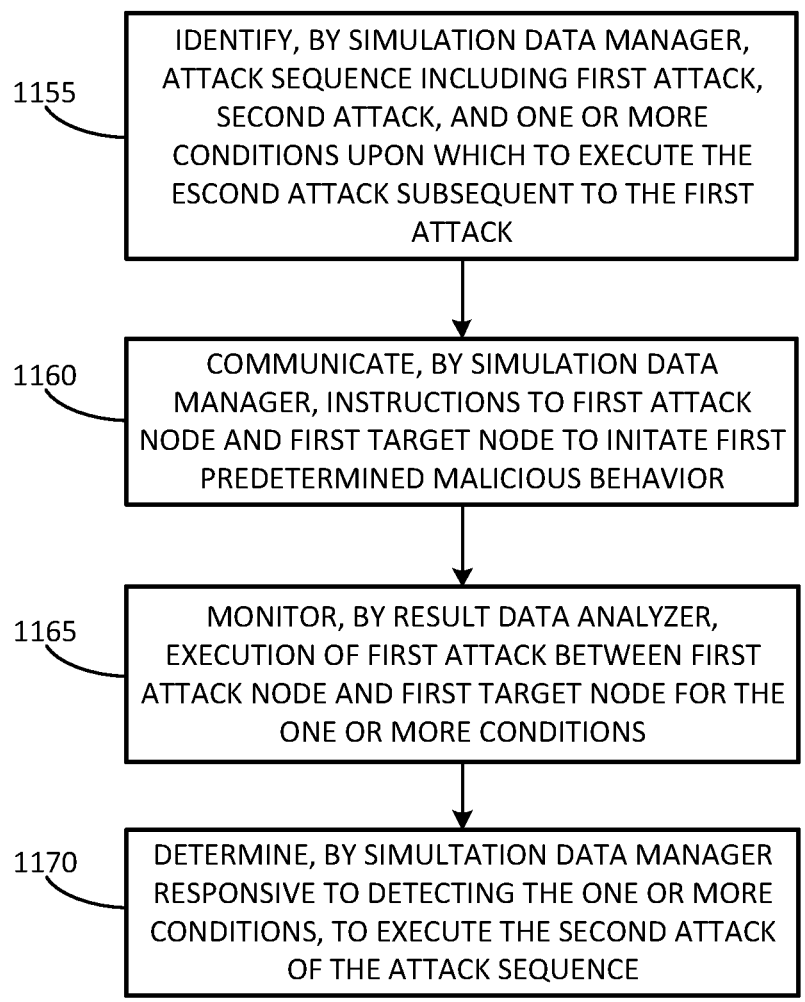
FIG. 11B is a flowchart of an example method for controlled execution of a sequence of attacks in a production network to test at least a portion of a security system of the production network.

FIG. 11B is a flowchart of an example method for controlled execution of a sequence of attacks in a production network to test at least a portion of a security system of the production network. In brief overview, the method 1150 includes identifying, by a simulation data manager, an attack sequence (step 1155), communicating, by the simulation data manager, instructions to the first attack node and the first target node in the production network (step 1160), monitoring, by a result data analyzer, execution of the first attack between the first attack node and the first target node for the one or more conditions (step 1165), and determining, by the simulation data manager responsive to detecting the one or more conditions via monitoring (step 1170).

Referring again to FIG. 11B, and in greater detail, the method 1150 includes identifying, by a simulation data manager (e.g., a simulation data manager 116 in FIG. 1B), an attack sequence including a first attack and a second attack (e.g., attack groups 1-4 in FIG. 5) and one or more conditions upon which to execute the second attack subsequent to the first attack (e.g., execution of the second attack is dependent upon the outcome of the first attack) (step 1155). In some implementations, referring to FIG. 5, the first attack (e.g., Group 1) can specify a first attack node (e.g., Node111c) and a first target node (e.g., MonsterNode1) in a production network, a first network path selected between the first attack node and the first target node, and a first predetermined malicious behavior (e.g., rapid port scan & OS detection). In some implementations, referring to FIG. 5, the second attack (e.g., Group 4) can specify a second attack node (e.g., MonsterNode1) and a second target node (e.g., AWSTestNode) in the production network, a second network path selected between the second attack node and the second target node (e.g., MonsterNode1 to Internal Servers to Internet to AWSTestNode), and a second predetermined malicious behavior (e.g., data exfiltration via FTP). In some implementations, each of the first and second attack nodes may be a controller (e.g., the controllers 140 in FIG. 1A) deployed within a zone of the production network. In some implementations, the simulation data manager can identify the attack sequence by identifying the attack sequence including the first attack node and the first target node on nodes with a type of operating system (e.g., a MAC OS X operating system) different than a type of operating system at least one of the second attack node and second target node (e.g., the Windows operating system). In some implementations, referring FIG. 5, the simulation data manager can identify the attack sequence including the first predetermined malicious behavior (e.g., rapid port scan & OS detection in Group 1) different than the second predetermined malicious behavior (e.g., data exfiltration via FTP in Group 4). In some implementations, referring to FIG. 5, the simulation data manager can identify the attack sequence including the first selected network path (e.g., Node111c to MonsterNode1 in Group 1) different than the second selected network path (e.g., MonsterNode1 to Internal Servers to Internet to AWSTestNode in Group 4).

The method 1150 also includes communicating, by the simulation data manager, instructions to the first attack node (e.g., Node111c in FIG. 5) and the first target node (e.g., MonsterNode1 in FIG. 5) in the production network to initiate the first predetermined malicious behavior (e.g., rapid port scan & OS detection) via the first path selected between the first attack node and the first target node (step 1160). In some implementations, the simulation data manager 116 can communicate directly with each of the first attack node and the first target node that are to be involved in a simulation. In such implementations, the simulation data manager 116 can send simulation data directly to both of the first attack node and the first target node. For example, the simulation data manager 116 (see FIG. 1B) can communicate simulation execution instructions including any information necessary for the first attack node to carry out the first predetermined malicious behavior (e.g., rapid port scan & OS detection). In some implementations, simulation instructions can include a collection of all of the requests that the first attack node or the first target node should make during a simulation, as well as all of the responses that the first attack node or the first target node should receive during the simulation. Simulation execution instructions can be based on an actual attack that has been carried out in the past and that could potentially pose a threat to the enterprise network 105 (see FIG. 1A). In some implementations, the simulation data manager 116 can generate instructions for such a simulation based on PCAP files corresponding to the first predetermined malicious behavior. In some implementations, the simulation data manager can transmit, responsive to instructions from the planner (e.g., the planner 115 in FIG. 1A) by the first attack node via a connection to the first target node and via at least a portion of the security system of the production network, network traffic including the first predetermined malicious behavior. For example, the network traffic including the malicious behavior can include information related to initial registration of each of the first attack node and the first target node, configuration of each of the nodes, and simulation execution instructions. In some implementations, the initial registration can be any process that pairs each of the first attack node and the first target node with the planner 115. In some implementations, referring to FIG. 1A, a private key exchange can take place between each of the first attack node and the first target node and the planner 115, which can ensure that no other computing devices can impersonate one of the first attack node and the first target node, which could compromise the security of the enterprise network 105 in which the first attack node and the first target node are deployed. In some implementations, as discussed above, the simulation execution instructions may include any information necessary for the first attack node and the first target node to carry out a simulated attack, e.g., a collection of all of the requests that the first attack node or the first target node should make during a simulation, as well as all of the responses that the first attack node or the first target node should receive during the simulation.

The method 1150 also includes monitoring, by a result data analyzer (e.g., the result data analyzer 117 in FIG. 1B), execution of the first attack between the first attack node and the first target node for the one or more conditions (step 1165). In some implementations, the result data analyzer also can receive information (e.g., metadata) from the first attack node, the first target node or other controllers (e.g., the controllers 140 in FIG. 1A) after a simulation has completed. For example, such metadata may include the start time and end time for the simulation, the sockets and ports used during the simulation, and an indication of whether the first attack node or the first target node received the expected responses from other controllers 140 during the simulation. In some implementations, the result data analyzer 117 can correlate the information received from the SIEM device 160 with the information received from the first attack node or the first target node. For example, the result data analyzer 117 can determine that the metadata received from the first attack node or the first target node indicates that it did not receive a response that it expected during a simulation. The result data analyzer 117 can then examine the data received from the SIEM device 160 to determine why the expected response was not received. For example, the result data analyzer 117 may determine based on the data received from the SIEM device that the expected response was not received because the packets corresponding to the expected response were blocked by one of the firewalls 150a and 150b or by one of the IPSs 155a-155d (see FIG. 1A).

In some implementations, the execution of the first attack can be monitored by detecting via monitoring the one or more conditions including at least one of failure or success of the first predetermined malicious attack. In some implementations, the result data analyzer 117 also can be configured to produce graphical output corresponding to the result data (e.g., failure or success of a simulated attack), which may be provided to an administrator. For example, referring to FIG. 6, such graphical output corresponding to the result data can include a graphical representation (e.g., a pie chart) of the number of simulated attacks that passed (i.e., were detected or 10 blocked) and the number of simulated attacks that failed (i.e., were executed in the enterprise network but were not detected or blocked), a color that may indicate whether the enterprise network properly defended against a particular stage of attack in various stages of attack (e.g., recon, deliver, exploit, execute, control, and action on the target node), a list of each group of attacks that was run during a simulation, as well as an indication of whether each group of attacks was successfully blocked and whether each group of attacks generated a security event (e.g., a detection of malicious traffic by a security mechanism in the enterprise network). Referring to FIG. 7, such graphical output corresponding to the result data can include a pie chart (e.g., the menu 720) showing the relative proportion of security monitors in the network for handling various types of attacks, including web-type attacks, scan/enum attacks, malicious file attacks, general type attacks, and auth2 attacks, an indication (e.g., the menu 725) of the number of monitors that are configured to detect or block various stages of an attack, including recon, weaponize, deliver, exploit, control, execute, and persist stages. Each stage 5 includes a numeric value representing the number of active monitors for that stage, a pie chart (e.g., the menu 730) showing the relative proportion of ways in which simulations generated a passing result in the enterprise network. For example, simulations may generate a passing result by refusing a connection associated with a simulated attack, by generating an event such as a flag indicating that an attack likely took place, or by generating an event and also blocking the attack that 10 corresponds to the event.

In some implementations, the execution of the first attack can be monitored by detecting via monitoring the one or more conditions including a time duration. For example, referring to FIG. 9, the graphical user interface (GUI) 900 displays the reporting options menu 905 that can allow a user to select a time duration (e.g., one month) as well as the types of results to be displayed for that time frame. Thereby, the GUI 900 can display the summary 910 including information relating to the number of simulations that have been run during the selected time duration and the detection rate for various selected types of simulations based on the method they used to transfer data, and a pie chart 915 showing the relative proportions of simulations run for each transfer method during the selected time duration.

The method 1150 also includes determining, by the simulation data manager (e.g., the simulation data manager 116; see FIG. 1B) responsive to detecting the one or more conditions via monitoring, to execute the second attack of the attack sequence (step 1170). For example, based on the result data of the first attack (e.g., failure or success of a simulated attack) obtained by monitoring at step 1165, the simulation data manager 116 can determine whether the second attack of the attack sequence is executed. In some implementations, the simulation data manager 116 can determine that the second attack is only to be performed if the first attack is not detected or blocked by security mechanisms in the network 510 (see FIG. 5).

In some implementations, the method 1150 includes communicating, by the simulation data manager, instructions to the second attack node (e.g., MonsterNode1 in Group 4 in FIG. 5) and the second target node (e.g., AWSTestNode in Group 4 in FIG. 5) in the production network to initiate the second predetermined malicious behavior (e.g., data exfiltration via FTP in Group 4 in FIG. 5) via the second path selected between the second attack node and the second target node (e.g., MonsterNode1 to Internal Servers to Internet to AWSTestNode as shown in the network diagram 510 in FIG. 5).

In some implementations, a system (e.g., the system 100 in FIG. 1A) for controlled execution of a sequence of attacks in a production network to test at least a portion of a security system of the production network, can include a simulation data manager (e.g., a simulation data manager 116 in FIG. 1B) executable on a processor coupled to memory, and a result data analyzer (e.g., the result data analyzer 117 in FIG. 1B). In some implementations, the simulation data manager can be configured to identify an attack sequence including a first attack and a second attack (e.g., attack groups 1-4 in FIG. 5) and one or more conditions upon which to execute the second attack subsequent to the first attack (e.g., execution of the second attack is dependent upon the outcome of the first attack). In some implementations, referring to FIG. 5, the first attack (e.g., Group 1) can specify a first attack node (e.g., Node111c) and a first target node (e.g., MonsterNode1) in a production network, a first network path selected between the first attack node and the first target node, and a first predetermined malicious behavior (e.g., rapid port scan & OS detection). In some implementations, referring to FIG. 5, the second attack can specify a second attack node (e.g., MonsterNode1) and a second target node (e.g., AWSTestNode) in the production network, a second network path selected between the second attack node and the second target node (e.g., MonsterNode1 to Internal Servers to Internet to AWSTestNode), and a second predetermined malicious behavior (e.g., data exfiltration via FTP). In some implementations, the simulation data manager can be configured to communicate instructions to the first attack node (e.g., Node111c in FIG. 5) and the first target node (e.g., MonsterNode1 in FIG. 5) in the production network to initiate the first predetermined malicious behavior (e.g., rapid port scan & OS detection) via the first path selected between the first attack node and the first target node. In some implementations, the result data analyzer (e.g., the result data analyzer 117 in FIG. 1B) can be configured to monitor execution of the first attack between the first attack node and the first target node for the one or more conditions (e.g., failure or success of the first predetermined malicious attack during a particular time duration). In some implementations, responsive to the result data analyzer (e.g., the simulation data manager 116; see FIG. 1B) detecting the one or more conditions (e.g., failure or success of a simulated attack), the simulation data manager can be configured to determine to execute the second attack of the attack sequence. For example, the simulation data manager 116 can determine that the second attack is only to be performed if the first attack is not detected or blocked by security mechanisms in the network 510 (see FIG. 5).

In some implementations, the simulation data manager of the system can be configured to communicate instructions to the second attack node (e.g., MonsterNode1 in Group 4 in FIG. 5) and the second target node (e.g., AWSTestNode in Group 4 in FIG. 5) in the production network to initiate the second predetermined malicious behavior (e.g., data exfiltration via FTP in Group 4 in FIG. 5) via the second path selected between the second attack node and the first second node (e.g., MonsterNode1 to Internal Servers to Internet to AWSTestNode as shown in the network diagram 510 in FIG. 5).

In some implementations, the simulation data manager of the system can be configured to identify the attack sequence including the first attack node and the first target node on nodes with a type of operating system (e.g., a MAC OS X operating system) different than at least one of the second attack node and second target node (e.g., the Windows operating system). In some implementations, referring FIG. 5, the simulation data manager of the system can be configured to identify the attack sequence including the first predetermined malicious behavior (e.g., rapid port scan & OS detection in Group 1) different than the second predetermined malicious behavior (e.g., data exfiltration via FTP in Group 4).

In some implementations, referring FIG. 5, the simulation data manager of the system can be configured to identify the attack sequence including the first selected network path (e.g., Node111c to MonsterNode1 in Group 1) different than the second selected network path (e.g., MonsterNode1 to Internal Servers to Internet to AWSTestNode in Group 4).

In some implementations, the first attack node of the system can be configured to, responsive to instructions from a planner (e.g., the planner 115 in FIG. 1A), transmit via a connection to the first target node and via at least a portion of the security system of the production network, network traffic including the first predetermined malicious behavior (e.g., information related to initial registration of each of the first attack node and the first target node, configuration of each of the nodes, and simulation execution instructions). In some implementations, as discussed above, the simulation execution instructions may include any information necessary for the first attack node and the first target node to carry out a simulated attack, e.g., a collection of all of the requests that the first attack node or the first target node should make during a simulation, as well as all of the responses that the first attack node or the first target node should receive during the simulation.

In some implementations, the result data analyzer of the system can be configured to detect the one or conditions including a time duration. For example, a user can select a time duration (e.g., one month) to display result data of attacks that have been run during the selected time duration (see FIG. 9).

In some implementations, the result data analyzer of the system can be configured to detect the one or conditions including at least one of failure or success of the first predetermined malicious attack. For example, the result data analyzer 117 can be configured to produce graphical output corresponding to the result data (e.g., failure or success of a simulated attack) including a pie chart (see FIG. 6), a color indication for each attack stage (see FIG. 6), a pie chart by attack types (see FIG. 7), an indication of number of attacks that succeeded or fails for each attack stage (see FIG. 7), or a heat map (see FIG. 8).

E. Packet Capture (PCAP) Traffic Recording

Packet capture (PCAP) files can be used to facilitate testing the security posture of a production network. In general, PCAP files may be files containing a history of network traffic sent between two or more pairs of computing devices during the execution of an actual attack or other malicious behavior. PCAP files may be generated, for example, by a network analyzer application that stores a record of the network traffic between the two or more devices while the devices are transmitting network packets that correspond to the malicious behavior. By capturing such malicious behavior in the form of a PCAP file, the actual network traffic associated with the behavior can be analyzed and replicated for the purpose of testing how a production network responds to a similar attack. The security of the network can then analyzed from different perspectives. For example, an entire network path can be tested based on a PCAP file that corresponds to an attack conducted along a network path, or an endpoint of a path can be tested in isolation, for example based on a PCAP file that corresponds to an attack conducted only on a network endpoint. In some implementations, a server can receive the results of the various attacks (e.g., results determined by each of a plurality of nodes involved in an attack). The server can then aggregate the results and provide the aggregated results to a network administrator. In some implementations, the server can provide the results to an event console, which may be a third party hardware device or software application having an API that allows the server to communicate with the event console.

Figure 12:
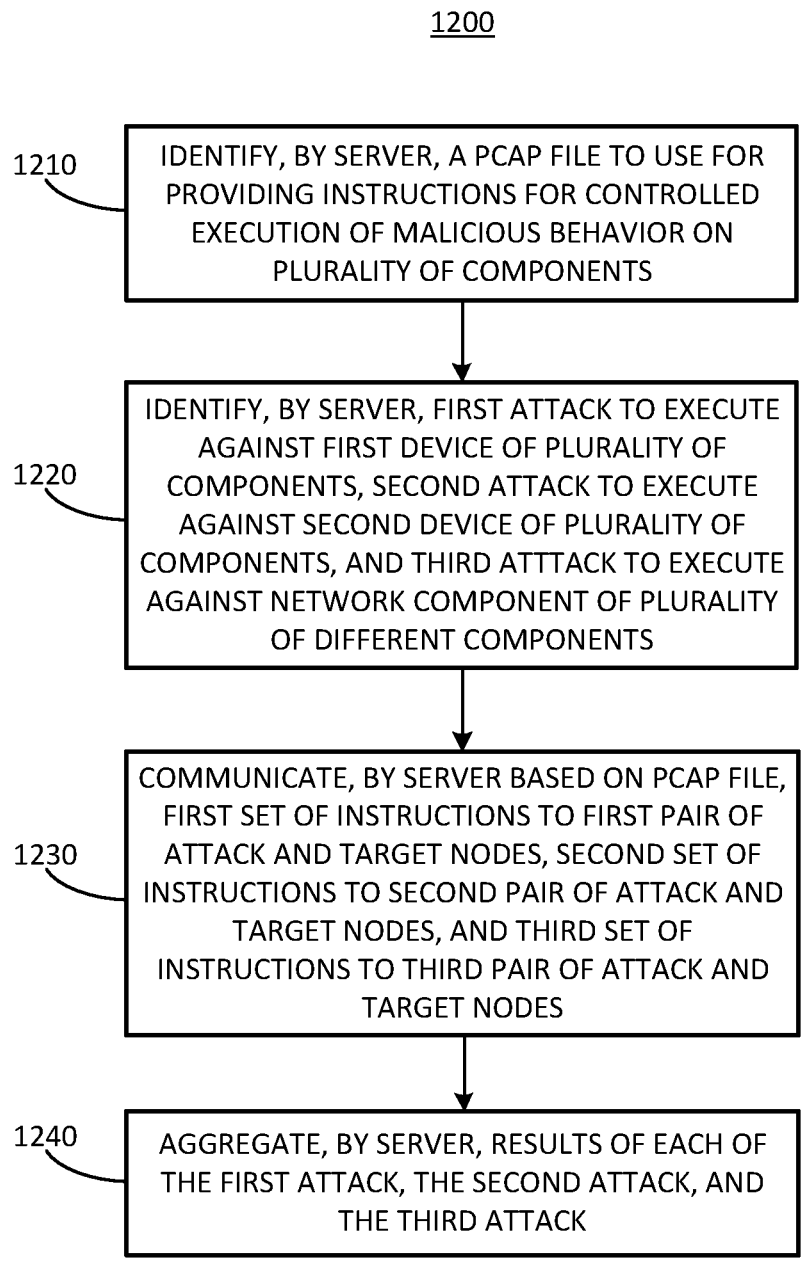
FIG. 12 is a flowchart of an example method for controlled execution of a malicious behavior between multiple different components in a production network to test at least a portion of a security system of the production network.

FIG. 12 is a flowchart of an example method 1200 for controlled execution of a malicious behavior between multiple different components in a production network to test at least a portion of a security system of the production network. In brief overview, the method 1200 includes identifying, by a server, a packet capture (PCAP) file to use for providing instructions for controlled execution of malicious behavior on a plurality of different components of a production network (step 1210). The method 1200 includes identifying, by the server, a first attack to execute against a first device of a plurality of different components, a second attack to execute against a second device of the plurality of different components, and a third attack to execute against a network component of the plurality of different components intermediary to the first end point device and the second device (step 1220). The method 1200 includes communicating, by the server based on at least the PCAP file, a first set of instructions to a first pair of attack and target nodes in the production network to initiate the malicious behavior of the PCAP file against the first device, a second set of instructions to a second pair of attack and target nodes in the production network to initiate the malicious behavior of the PCAP file against the second device, and a third set of instructions to a third pair of attack and target nodes in the production network to initiate the malicious behavior of the PCAP file against the network component intermediary to the first device and the second device (step 1230). The method 1200 also includes aggregating, by the server, results of each of the first attack, the second attack, and the third attack to provide an aggregated view of the malicious behavior between the first device and the second device via the network component (step 1240).

Referring again to FIG. 12, and in greater detail, the method 1200 includes identifying, by a server, a packet capture (PCAP) file to use for providing instructions for controlled execution of malicious behavior on a plurality of different components of a production network (step 1210). In some implementations, the server can be a computing device such as the planner 115 shown in FIGS. 1A and 1B. Thus, in some implementations, the server can receive a plurality of PCAP files, which may be stored, for example, in a database of the planner such as the database 118 shown in FIG. 1B. In general, a PCAP file can include a record of the data packets transmitted between a pair of devices during an attack corresponding to malicious behavior. In some implementations, the particular PCAP file identified in step 1210 can be selected based on a particular type of attack or malicious behavior that is to be tested in the production network.

In some implementations, the server can analyze a PCAP file to extract an application-layer record of requests and responses exchanged between the attacker and the target in the network traffic represented by the PCAP file. The server also may extract an actual malware file from the PCAP file. The PCAP file will typically contain low-level packet information related to data exchanged during the attack. However, the server can process the PCAP file to extract the higher-level application layer record of each request and response, to create a set of instructions for network nodes to accurately replicate the attack within the production network. In some implementations, the server can be configured to process a PCAP file by first identifying each host conversation within the PCAP file. For example, the server can make this determination based on the communication protocol used in the PCAP file. In some implementations, the server also can determine the type of application traffic represented by the PCAP file, such as HTTP traffic that may be sent using TCP, or DNS traffic that may be sent using UDP. In some implementations, the determination of the type of application traffic represented by the PCAP file can be made based on the use of application signatures in the PCAP file.

The method 1200 includes identifying, by the server, a first attack to execute against a first device of a plurality of different components, a second attack to execute against a second device of the plurality of different components, and a third attack to execute against a network component of the plurality of different components intermediary to the first end point device and the second device (step 1220). In some implementations, identifying the sequence of first, second, and third attacks can allow for more complete testing of one or more network paths in the production network. As illustrated in the enterprise network 105 shown in FIG. 1A, network paths may be complex and may traverse multiple devices within the network. For example, there is no direct path between the computing device 120a in the workstations zone of the enterprise network 105 and the computing device 130a in the internal servers zone of the enterprise network 105. Thus, to test security along this path, multiple computing devices (i.e., at least the computing device 120a, the IPSs 155a and 155c, and the router 145) must be involved, as they are positioned along the path joining the computing device 120 and the computing device 130a.

In some implementations, the server can be configured to select the sequence of the first attack, the second attack, and the third attack based on a particular network path under test. IN some implementations, at least one of the first device and the second device can be an endpoint device. Referring again to FIG. 1A, for example, the first device targeted for attack could be the computing device 120a, the second device targeted for the second attack could be the router 145, and the network component targeted for the third attack could be the IPS 155a, which is intermediary to both the first device (i.e., the computing device 120a) and the second device (i.e., the router 145). It should be understood that these devices are illustrative only, and that in practice, the server can be configured to identify any set of computing devices in the production network as the first device, the second device, and the network component, depending on the desired network path that is to be subjected to the test. For example, in some implementations, the server can be configured to target the controllers 140a-140e shown in FIG. 1A, rather than the production equipment, such as the computing devices 120, 125, 130, and 135, in order to protect the production equipment from malicious behavior.

The method 1200 includes communicating, by the server based on at least the PCAP file, a first set of instructions to a first pair of attack and target nodes in the production network to initiate the malicious behavior of the PCAP file against the first device, a second set of instructions to a second pair of attack and target nodes in the production network to initiate the malicious behavior of the PCAP file against the second device, and a third set of instructions to a third pair of attack and target nodes in the production network to initiate the malicious behavior of the PCAP file against the network component intermediary to the first device and the second device (step 1230). As described above, the server can process the PCAP file to determine the network traffic between each pair of network devices represented in the PCAP file. Based on the determined network traffic, the server can generate a set of instructions that will cause the pairs of devices to send network traffic to replicate the attack represented in the PCAP file. The instructions can include any type and form of data relating to the attacks to be carried out. For example, the instructions can include a sequence of network packets that should be sent between each pair of devices for each respective attack. The instructions also can include metadata that can facilitate execution of the malicious behavior. The server can determined such metadata based on the PCAP file. The metadata can be any form data indicating the types and/or content of one or more requests or responses that each device should send or receive. In some implementations, the instructions also can include timing or other conditional information for the attacks. For example, the instructions may cause the second attack to be carried out only upon completion of the first attack.

The method 1200 also includes aggregating, by the server, results of each of the first attack, the second attack, and the third attack to provide an aggregated view of the malicious behavior between the first device and the second device via the network component (step 1240). After the server communicates the first, second, and third sets of instructions to the respective pairs of attack and target nodes in step 1230, the pairs of attack and target nodes can perform the attacks according to the instructions. Generally, execution of the attacks includes sending and receiving network traffic between the respective pairs of nodes according to the instructions. In some implementations, the pairs of nodes can determine results of their respective attacks. For example, as described above, the instructions that the server communicates to each node can include data (or metadata) indicating responses that each node should expect to receive during the execution of the attack. The nodes can compare the actual responses they receive to the expected responses to determine a match, which may indicate a successful attack, or a mismatch, which may indicate an unsuccessful attack. After determining the results of their respective attacks, each attack-target node pair can transmit the results back to the server. The server can aggregate the results it receives from the attack-target node pairs, and can provide the aggregated results to an administrator with a complete description of how the production network responded to the attack. In some implementations, the server can provide the aggregated results to a third party event console, such as the SIEM 160 shown in FIG. 1A. For example, the server can communicate with the event console via an API provided by the event console. In some implementations, the server also can request event information from the event console. For example, the server can receive an indication of events detected by the event console during any of the first, second, or third attacks, and can correlate the events to the results of the attacks it receives from the nodes involved in the attacks.

F. Computing Devices

Figure 13A:
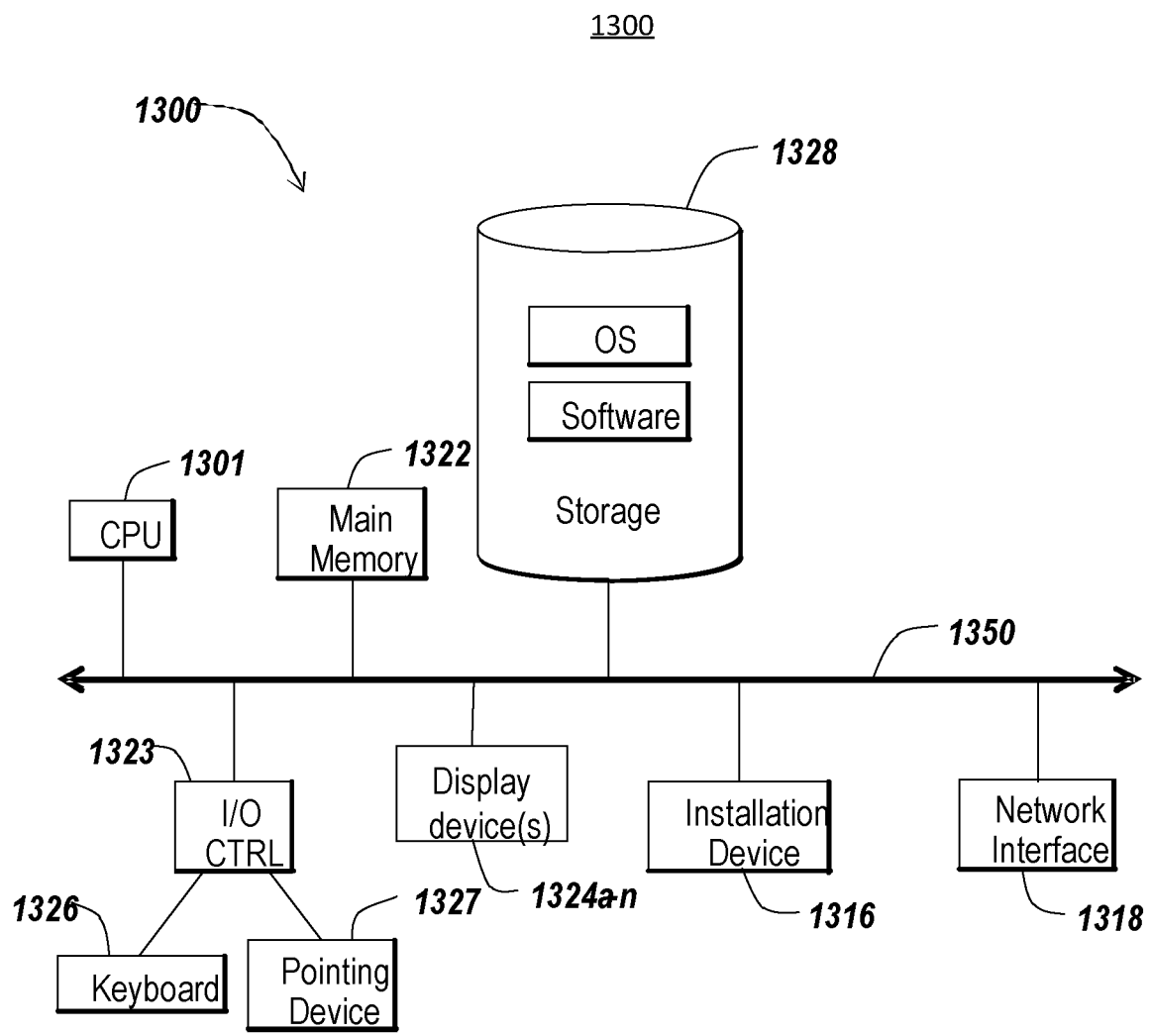
FIGS. 13A and 13B are block diagrams of implementations of an example computing device.
Figure 13B:
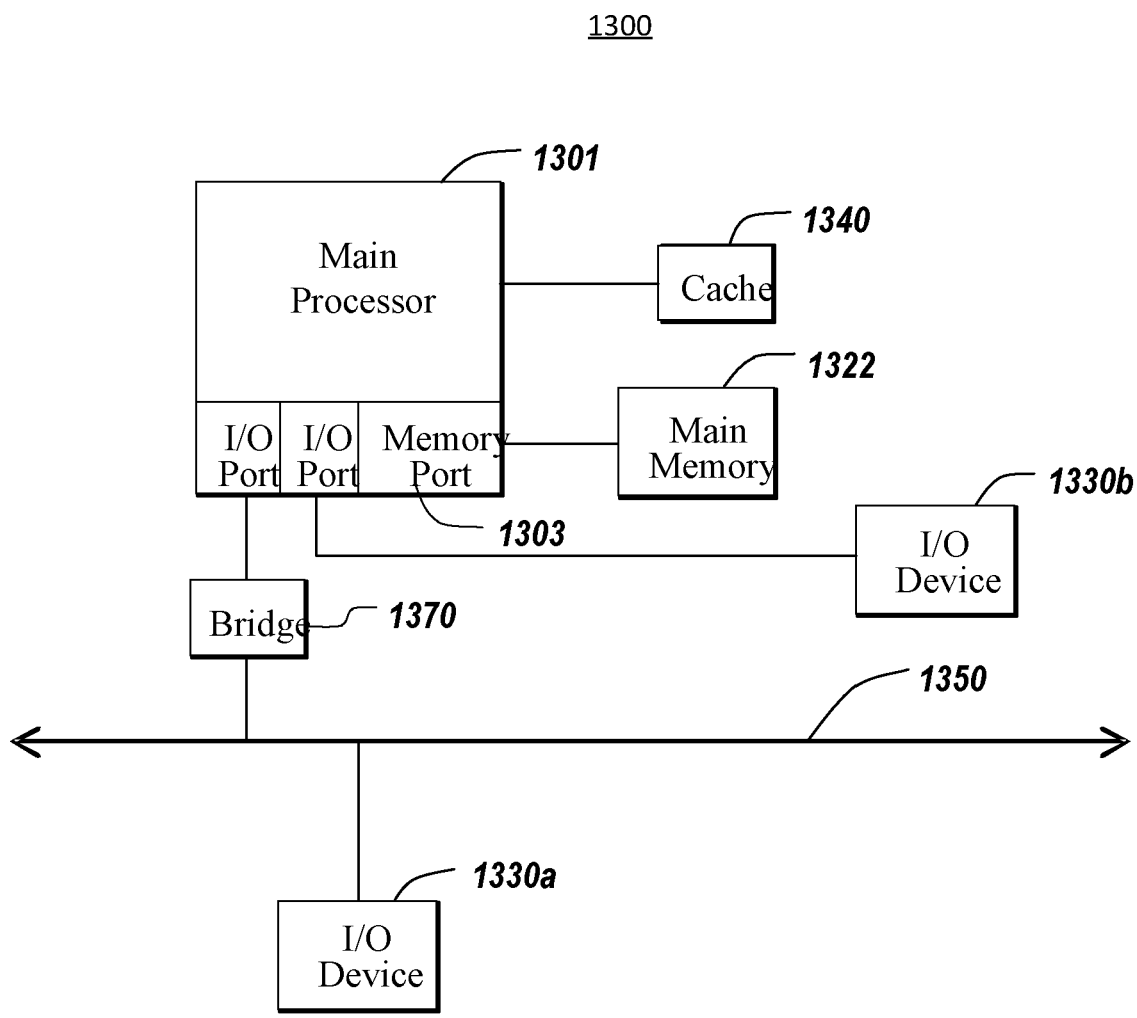

FIGS. 13A and 13B are block diagrams of implementations of an example computing device 1300. In some implementations, the computing device 1300 may be useful for implementing the planner 115 or the controller 140 shown in FIGS. 1A-1C. As shown in FIGS. 13A and 13B, each computing device 1300 includes a central processing unit 1301, and a main memory unit 1322. As shown in FIG. 1E, a computing device 1300 may include a visual display device 1324, a keyboard 1326 and/or a pointing device 1327, such as a mouse. Each computing device 1300 may also include additional optional elements, such as one or more input/output devices 1330*a*-1330*b* (generally referred to using reference numeral 1330), and a cache memory 1340 in communication with the central processing unit 1301.

The central processing unit 1301 is any logic circuitry that responds to and processes instructions fetched from the main memory unit 1322. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 1300 may be based on any of these processors, or any other processor capable of operating as described herein.

Main memory unit 1322 may be one or more memory chips capable of storing data and allowing any storage location to be directly accessed by the central processing unit 1301, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 1322 may be based on any of the above described memory chips, or any other available memory chips capable of operating as described herein. In the embodiment shown in FIG. 13A, the central processing unit 1301 communicates with main memory 1322 via a system bus 1350 (described in more detail below). FIG. 13B depicts an embodiment of a computing device 1300 in which the processor communicates directly with main memory 1322 via a memory port 1303. For example, in FIG. 13B the main memory 1322 may be DRDRAM.

FIG. 13B depicts an embodiment in which the central processing unit 1301 communicates directly with cache memory 1340 via a secondary bus, sometimes referred to as a backside bus. In other embodiments, the central processing unit 1301 communicates with cache memory 1340 using the system bus 1350. Cache memory 1340 typically has a faster response time than main memory 1322 and is typically provided by SRAM, BSRAM, or EDRAM. In the embodiment shown in FIG. 13B, the central processing unit 1301 communicates with various I/O devices 1330 via a local system bus 1350. Various busses may be used to connect the central processing unit 1301 to any of the I/O devices 1330, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1324, the central processing unit 1301 may use an Advanced Graphics Port (AGP) to communicate with the display 1324. FIG. 13B depicts an embodiment of a computer 1300 in which the central processing unit 1301 communicates directly with I/O device 1330*b* via HyperTransport, Rapid I/O, or InfiniBand. FIG. 13B also depicts an embodiment in which local busses and direct communication are mixed: the central processing unit 1301 communicates with I/O device 1330*b* using a local interconnect bus while communicating with I/O device 1330*a* directly.

The computing device 1300 may support any suitable installation device 1316, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any program related to the planner 115 or the controller 140. The computing device 1300 may further comprise a storage device 1328, such as one or more hard disk drives or redundant arrays of independent disks, for storing an operating system and other related software, and for storing application software programs such as any program related to either the planner 115 or the controller 140. Optionally, any of the installation devices 1316 could also be used as the storage device 1328. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 1300 may include a network interface 1318 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 1318 may comprise a built-in network adapter, network interface card, PCMCIA network card, card bus network adapter, wireless network adapter, USB network adapter, modem or any other device suitable for interfacing the computing device 1300 to any type of network capable of communication and performing the operations described herein.

A wide variety of I/O devices 1330*a*-1330*n* may be present in the computing device 1300. Input devices include keyboards, mice, trackpads, trackballs, microphones, and drawing tablets. Output devices include video displays, speakers, inkjet printers, laser printers, and dye-sublimation printers. The I/O devices 1330 may be controlled by an I/O controller 1323 as shown in FIG. 13A. The I/O controller may control one or more I/O devices such as a keyboard 1326 and a pointing device 1327, e.g., a mouse or optical pen. Furthermore, an I/O device may also provide storage 1328 and/or an installation medium 1316 for the computing device 1300. In still other embodiments, the computing device 1300 may provide USB connections to receive handheld USB storage devices such as the USB Flash Drive line of devices manufactured by Twintech Industry, Inc. of Los Alamitos, Calif.

In some embodiments, the computing device 1300 may comprise or be connected to multiple display devices 1324*a*-1324*n*, which each may be of the same or different type and/or form. As such, any of the I/O devices 1330*a*-1330*n* and/or the I/O controller 1323 may comprise any type and/or form of suitable hardware, software, or combination of hardware and software to support, enable or provide for the connection and use of multiple display devices 1324*a*-1324*n* by the computing device 1300. For example, the computing device 1300 may include any type and/or form of video adapter, video card, driver, and/or library to interface, communicate, connect or otherwise use the display devices 1324*a*-1324*n*. In one embodiment, a video adapter may comprise multiple connectors to interface to multiple display devices 1324a-1324n. In other embodiments, the computing device 1300 may include multiple video adapters, with each video adapter connected to one or more of the display devices 1324a-1324n. In some embodiments, any portion of the operating system of the computing device 1300 may be configured for using multiple displays 1324a-1324n. In other embodiments, one or more of the display devices 1324a-1324n may be provided by one or more other computing devices, such as computing devices 1300a and 1300b connected to the computing device 1300, for example, via a network. These embodiments may include any type of software designed and constructed to use another computer's display device as a second display device 1324a for the computing device 1300. One ordinarily skilled in the art will recognize and appreciate the various ways and embodiments that a computing device 1300 may be configured to have multiple display devices 1324a-1324n.

In further embodiments, an I/O device 1330 may be a bridge 1370 between the system bus 1350 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 1300 of the sort depicted in FIGS. 13A and 13B typically operate under the control of operating systems, which control scheduling of tasks and access to system resources. The computing device 1300 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 1300 may have different processors, operating systems, and input devices consistent with the device. For example, in one embodiment the computer 1300 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 1300 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method comprising:
   identifying, by a controller, a simulated attack sequence to test security of at least a portion of a network, the simulated attack sequence comprising at least a specification of a second simulated attack to execute subsequent to a first simulated attack based at least on a status of execution of the first simulated attack;
   receiving, by the controller responsive to monitoring execution of the first simulated attack, an indication of the status of execution of the first simulated attack; and
   communicating, by the controller responsive to the indication of the status of execution of the first simulated attack, instructions to a first device and a second device based at least on the specification of the second simulated attack of the simulated attack sequence to execute via a path of the network selected between the first device and the second device.

2. The method of claim 1, wherein the specification specifies instructions for simulation of a malicious behavior via network traffic.

3. The method of claim 1, wherein the simulated attack sequence further comprises specification of the first simulated attack, a pair of devices for the first simulated attack and a second path of the network between the pair of devices for executing simulation of the first simulated attack.

4. The method of claim 1, further comprising communicating, by the controller, to each of the first device and the second device instructions to replicate network traffic to simulate the malicious behavior between a pairing of the first device and the second device.

5. The method of claim 1, further comprising communicating, by the controller, to each of the first device and the second device the instructions responsive to receiving the indication of one of failure or success of the first simulated attack.

6. The method of claim 1, further comprising communicating network traffic between the first device and the second device to replicate network traffic between the first device and the second device to simulate a malicious behavior specified by the specification of the second simulated attack.

7. The method of claim 1, wherein at least one of the first device or the second device is a workstation of a user.

8. The method of claim 1, wherein at least one of the first device or the second device is a server.

9. The method of claim 1, wherein the controller is configured on at least one of the first device or the second device.

10. The method of claim 1, further comprising receiving, by the controller, the path of the network between the first device and the second device selected via an interaction by a user with a graphical representation of a topology of the network.

11. The method of claim 1, wherein a malicious behavior to be simulated by the second simulated attack is different from malicious behavior simulated by the first simulated attack.

12. The method of claim 1, wherein at least one of the first device or the second device comprises an operating system different than an operating system of a device used for the first simulated attack.

13. The method of claim 1, wherein the status of execution of the first simulated attack comprises one of success or failure of the first simulated attack.

14. A method comprising:
receiving, by a controller, a specification of a simulated attack and a path to execute the simulated attack between a pair of devices selected from a representation of a topology of a network;
receiving, by the controller, one or more conditions of a status of execution of a previous simulated attack upon which to execute the simulated attack;
establishing, by the controller, a simulated attack sequence comprising the specification of the simulated attack and the one or more conditions responsive to which to execute the simulated attack subsequent to the previous simulated attack; and
selecting, by the controller, the simulated attack sequence from a plurality of simulated attack sequences to test security of at least a portion of the network based at least on execution of the simulated attack of the simulated attack sequence responsive to one or more conditions of the status of execution of the previous simulated attack being met.

15. The method of claim 14, wherein the specification specifies instructions for simulation of a malicious behavior via network traffic between the pair of devices.

16. The method of claim 14, wherein the status of execution of the previous simulated attack comprises one of success or failure of the previous simulated attack.

17. The method of claim 14, further comprising generating, by the controller, the simulated attack sequence responsive to receiving the specification of the simulated attack, the path to execute the simulated attack between the pair of devices and the one or more conditions.

18. The method of claim 17, further comprising selecting, by the controller, the simulated attack sequence from a database comprising the plurality of attack sequences.

19. The method of claim 14, wherein the previous simulated attack sequence further comprises specification of the previous simulated attack, a second pair of devices for the previous simulated attack and a second path of the network between the second pair of devices for executing simulation of the previous simulated attack.

20. The method of claim 14, further comprising communicating, by the controller, to each of a first device and a second device of the pair of devices instructions to replicate network traffic to simulate the malicious behavior between the pair of devices.

21. The method of claim 14, wherein at least one of the pair of devices is a workstation of a user.

22. The method of claim 14, wherein at least one of the pair of devices is a server.

23. The method of claim 14, wherein the controller is configured on at least one of one of the pair of devices.

24. The method of claim 14, further comprising receiving, by the controller, the path of the network between the pair of devices selected via an interaction by a user with a graphical representation of a topology of the network.

25. The method of claim 14, wherein a malicious behavior to be simulated by the simulated attack is different from malicious behavior simulated by the previous simulated attack.

26. The method of claim 14, wherein the pair of devices comprises an operating system different than an operating system of one of a pairing of devices used for the previous simulated attack.

27. A system comprising:
one or more processors, coupled to memory;
a controller configured to execute on the one or more processors to:
identify a simulated attack sequence to test security of at least a portion of a network, the simulated attack sequence comprising at least a specification of a second simulated attack to execute subsequent to a first simulated attack based at least on a status of execution of the first simulated attack;
receive, responsive to monitoring execution of the first simulated attack, an indication of the status of execution of the first simulated attack; and
communicate, responsive to the indication of the status of execution of the first simulated attack, instructions to a first device and a second device based at least on the specification of the second simulated attack of the simulated attack sequence to execute via a path of the network selected between the first device and the second device.

28. The system of claim 27, wherein the controller is further configured to select from a database the simulated attack sequence from a plurality of different attack sequences available to test security of different portions of the network.

29. The system of claim 27, further comprising a monitor configured to execute on the one or more processors to identify the status of execution of at least the first simulated attack.

30. The system of claim 27, wherein the simulated attack sequence further comprises specification of the first simulated attack, a pair of devices for the first simulated attack and a path of the network between the pair of devices for executing simulation of the first simulated attack.

31. The system of claim 30, wherein the controller is further configured to execute the first simulated attack between the pair of devices by communicating instructions to the pair of devices to replicate network traffic to simulate malicious behavior between the pair of devices.

32. The system of claim 27, wherein the controller is further configured to communicate to each of the first device and the second device the instructions responsive to receiving the indication of status of execution of the first simulated attack.

33. The system of claim 27, wherein responsive to the instructions from the controller, the first device and the second device are configured to replicate network traffic between the first device and the second device to simulate a malicious behavior specified by the specification of the second simulated attack.

34. The system of claim 27, wherein at least one of the first device or the second device is a workstation of a user.

35. The system of claim 27, wherein at least one of the first device or the second device is a server.

36. The system of claim 27, wherein the controller is further configured to execute on at least one of the first device or the second device.

37. The system of claim 27, wherein the controller is further configured to receive the path of the network between the first device and the second device selected via an interaction by a user with a graphical representation of a topology of the network.

38. The system of claim 27, wherein a malicious behavior to be simulated by the second simulated attack is different from malicious behavior simulated by the first simulated attack.

39. The system of claim 27, wherein at least one of the first device or the second device comprises an operating system different than an operating system of any device used for the first simulated attack.

40. The system of claim 27, wherein the status of execution of the first simulated attack comprises one of success or failure of the first simulated attack.

* * * * *